United States Patent
Qi et al.

(10) Patent No.: US 12,041,372 B2
(45) Date of Patent: Jul. 16, 2024

(54) VIDEO SPECIAL EFFECT PROCESSING METHOD AND APPARATUS, AND ELECTRONIC DEVICE

(71) Applicant: Tencent Technology (Shenzhen) Company Limited, Shenzhen (CN)

(72) Inventors: Guopeng Qi, Shenzhen (CN); Renjian Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 102 days.

(21) Appl. No.: 17/730,050

(22) Filed: Apr. 26, 2022

(65) Prior Publication Data

US 2022/0264029 A1    Aug. 18, 2022

Related U.S. Application Data

(63) Continuation of application No. PCT/CN2021/095994, filed on May 26, 2021.

(30) Foreign Application Priority Data

Jun. 28, 2020 (CN) .......................... 202010599847.1

(51) Int. Cl.
   *H04N 5/262*       (2006.01)
   *H04N 21/239*      (2011.01)
   (Continued)

(52) U.S. Cl.
   CPC ......... *H04N 5/262* (2013.01); *H04N 21/2393* (2013.01); *H04N 21/44012* (2013.01); *H04N 21/4402* (2013.01); *H04N 21/4781* (2013.01)

(58) Field of Classification Search
None
See application file for complete search history.

(56) References Cited

U.S. PATENT DOCUMENTS

| 7,903,927 B2 | 3/2011 | Minami et al. |
| 2006/0008247 A1* | 1/2006 | Minami ................. G11B 27/34 386/280 |

(Continued)

FOREIGN PATENT DOCUMENTS

| CN | 106060581 A | 10/2016 |
| CN | 108632540 A | 10/2018 |

(Continued)

OTHER PUBLICATIONS

Tencent Technology, ISR, PCT/CN2021/095994, Aug. 13, 2021, 3 pgs.

(Continued)

*Primary Examiner* — Daniel T Tekle
(74) *Attorney, Agent, or Firm* — Morgan, Lewis & Bockius LLP

(57) ABSTRACT

An electronic device obtains a video special effect file. The device extracts a duration scaling logic from the video special effect file. The device obtains a target playback duration that needs to be achieved during application of the video special effect file to a design scene. The target playback duration is different from an original playback duration of the video special effect file. The device determines a special effect frame corresponding to a target timeline in the video special effect file according to the duration scaling policy. The target timeline has a length that is the same as the target play duration. The device renders a plurality of frames of a video according to the special effect frame, so as to obtain a target video special effect that matches the target playback duration.

20 Claims, 9 Drawing Sheets

(51) Int. Cl.
  *H04N 21/44* (2011.01)
  *H04N 21/4402* (2011.01)
  *H04N 21/478* (2011.01)

(56) References Cited

U.S. PATENT DOCUMENTS

| | | | |
|---|---|---|---|
| 2008/0253735 A1 | 10/2008 | Kuspa et al. | |
| 2013/0110978 A1* | 5/2013 | Gordon | H04N 21/4788 709/218 |
| 2015/0373402 A1* | 12/2015 | Zimmeri | H04N 21/426 725/59 |
| 2016/0004390 A1* | 1/2016 | Laska | H04N 7/186 715/723 |
| 2020/0267435 A1* | 8/2020 | Gordon | H04N 21/8586 |
| 2021/0098022 A1* | 4/2021 | Chen | G11B 27/036 |
| 2021/0349382 A1* | 11/2021 | Yang | H04N 21/4122 |
| 2021/0350605 A1* | 11/2021 | Chen | H04N 19/176 |
| 2022/0264029 A1* | 8/2022 | Qi | H04N 21/4402 |
| 2023/0012089 A1* | 1/2023 | Tang | H04N 21/4788 |

FOREIGN PATENT DOCUMENTS

| | | | |
|---|---|---|---|
| CN | 110674341 | * | 11/2019 |
| CN | 110674341 | A | 1/2020 |
| CN | 110677713 | A | 1/2020 |
| CN | 110708596 | A | 1/2020 |
| CN | 110769313 | A | 2/2020 |
| CN | 111031393 | A | 4/2020 |
| CN | 111669623 | A | 9/2020 |
| JP | 2012054619 | A | 3/2012 |
| KR | 20190075672 | A | 7/2019 |

OTHER PUBLICATIONS

Tencent Technology, Extended European Search Report and Supplementary Search Report, EP20770930.4, Dec. 16, 2022, 10 pgs.
Tencent Technology, WO, PCT/CN2021/095994, Aug. 13, 2021, 5 pgs.
Tencent Technology, IPRP, PCT/CN2021/095994, Dec. 13, 2022, 6 pgs.
Ryosuke Yamaguchi et al., Adobe After Effects CC/CS6 Super Technique, Jan. 2014, Retrieved from the Internet: https://www.hanmoto.com/bd/isbn/9784800710161.

* cited by examiner

VIDEO SPECIAL EFFECT PROCESSING METHOD AND APPARATUS, AND ELECTRONIC DEVICE

CROSS-REFERENCE TO RELATED APPLICATIONS

This application is a continuation application of PCT Patent Application No. PCT/CN2021/095994, entitled "VIDEO SPECIAL EFFECT PROCESSING METHOD AND APPARATUS, AND ELECTRONIC DEVICE" filed on May 26, 2021, which claims priority to Chinese Patent Application No. 202010599847.1, filed with the State Intellectual Property Office of the People's Republic of China on Jun. 28, 2020, and entitled "VIDEO SPECIAL EFFECT PROCESSING METHOD AND DEVICE AND ELECTRONIC EQUIPMENT", all of which are incorporated herein by reference in their entirety.

FIELD OF THE TECHNOLOGY

This application relates to digital multimedia technologies, and in particular, to a video special effect processing method and apparatus, an electronic device, and a computer-readable storage medium.

BACKGROUND OF THE DISCLOSURE

The development of the Internet, especially the mobile Internet, has led to the unprecedented used of videos as a medium for information dissemination. In order to enhance the expressiveness of information carried in a video and to increase the attention, the related technology usually adds an additional video special effect to a finished video.

For example, in the related technology, special effects animations can be designed based on professional video editing and design software such as Adobe After Effects (AE). A solution of the open-source animation library Lottie of Airbnb and a solution of Portable Animated Graphics (PAG) may be used in AE.

However, durations of video special effects designed by the video editing and design software are fixed after the design is completed. This makes it difficult to apply the same video special effect to application scenarios of video playing with diversified requirements. The generation of various video special effects with different playback durations in advance for various possible scenarios not only causes a waste of computing resources, but also affects real-time video presentation.

SUMMARY

Embodiments of this application provide a video special effect processing method. The method includes:

obtaining a video special effect file, and extracting a duration scaling logic from the video special effect file;

obtaining a target playback duration that needs to be achieved during application of the video special effect file to a design scene, the target playback duration being different from an original playback duration of the video special effect file;

determining a special effect frame corresponding to a target timeline in the video special effect file according to the duration scaling policy;

a length of the target timeline being consistent with the target playback duration; and performing rendering (e.g., rendering a plurality of frames of a video) according to the special effect frame, so as to obtain a target video special effect conforming to the target playback duration.

The embodiments of this application provide an apparatus, an electronic device, and a computer-readable storage medium related to the video special effect processing method.

DESCRIPTION OF EMBODIMENTS

Figure 1:
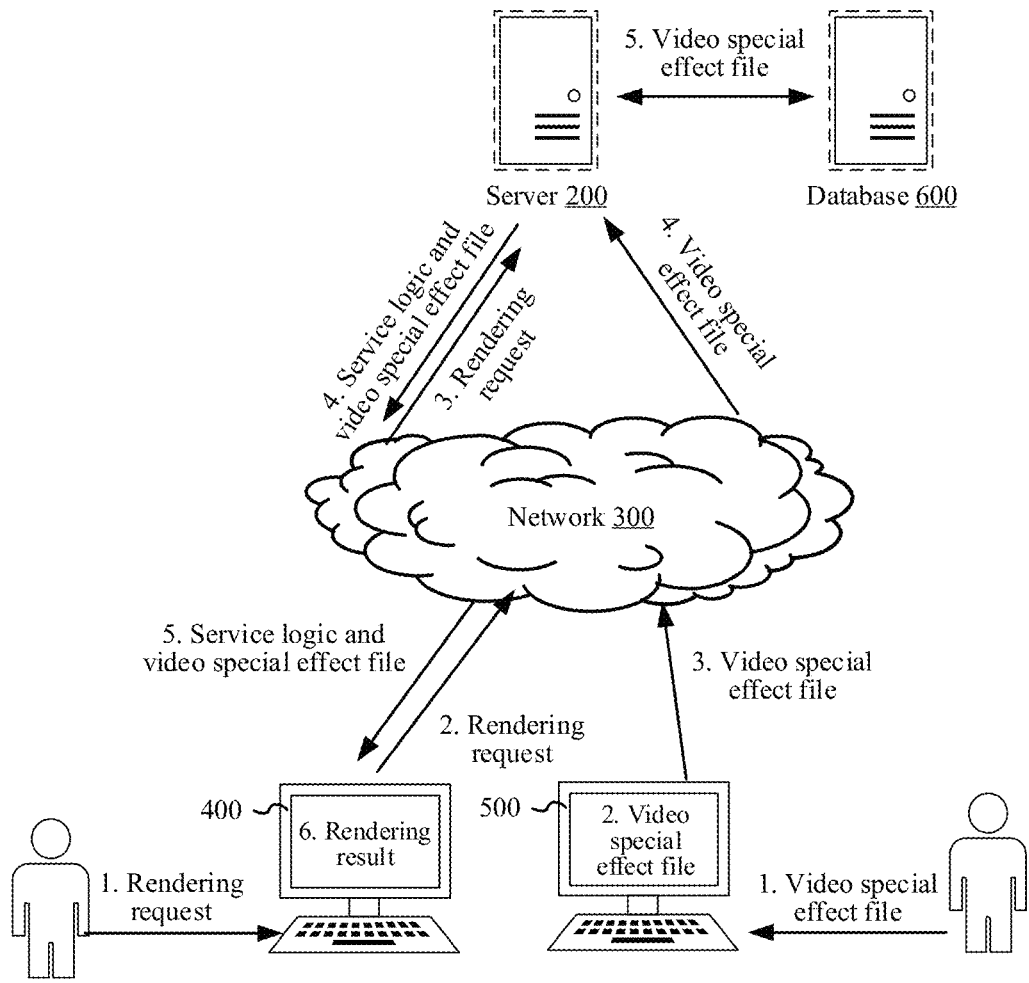
FIG. 1 is a schematic structural diagram of a video special effect processing system according to an embodiment of this application.

Before the embodiments of this application are further described in detail, nouns and terms involved in the embodiments of this application are described. The nouns and terms provided in the embodiments of this application are applicable to the following explanations.

(1) AE is short for Adobe After Effects, is a graphics video processing software launched by Adobe, for organizations engaged in design and video special effects, including television stations, animation production companies, personal post-production studios, and multimedia studios, and belongs to layer-type post-production software.

(2) A video special effect file is a binary file that carries effects content, such as a PAG file, and is a sticker animation stored in a binary file format.

(3) An original timeline is a timeline corresponding to an entire video special effect file, or a timeline corresponding to a special-effect part corresponding to a video special effect subfile during playing.

(4) A target timeline is a timeline corresponding to playing of a complete special effect object in a video special effect file after time-scaling, or a timeline corresponding to playing of a partial special effect object corresponding to a video special effect subfile after scaling.

In the related technology, a mobile Internet client implements, based on AE, animation solutions including the open-source Lottie solution of Airbnb and the PAG solution. Both solutions have opened up a workflow from AE animation design to mobile terminal presentation. An animation file is exported through an export plug-in based on an animation designed by a designer on AE, and is then loaded and rendered through a software development kit (SDK) on a mobile terminal, thereby greatly reducing development costs. However, durations of animation files designed by AE in the two solutions are both fixed. In the process of implementing the embodiments of this application, the applicant found that in some scenarios of user interface animation and video editing, there is a need for external control of a duration (e.g., time, length, etc.) of an animation file, such as fixing a partial interval animation file, and performing linear scaling or looping of a partial internal animation. For example, when a length of a sticker animation is two seconds, but an actual need for an animation length is four seconds, the sticker animation needs to be extended from two seconds to four seconds externally, or the sticker animation needs to be played repeatedly (e.g., played twice).

In view of the technical problem of discrepancy between a fixed (e.g., cannot be modified) video special effect file and any target playback duration requirement in the related technology, the embodiments of this application provide a video special effect processing method that can support time scaling (e.g., stretching, extending, or compressing) of a fixed animation file. In addition, an external application platform only needs to set a target play time of the animation file, and the animation file can be time-scaled according to a user-configured scaling policy. Playback duration scaling processing of a video special effect file is controlled by a duration scaling logic (e.g., duration scaling policy, rules, etc.) in the video special effect file. The video special effect file is processed and rendered according to the scaling logic after being decoded, so that a target video special effect of a target playback duration can be achieved. This can be directly applied to various applications and various platforms, without being limited by operating systems of the platforms, providing an extremely simple implementation procedure.

The following describes an exemplary application of an electronic device provided in the embodiments of this application. The electronic device provided in the embodiments of this application may be implemented as various types of terminal devices such as a notebook computer, a tablet computer, a desktop computer, a set top box, or a mobile device (such as a mobile phone, a portable music player, a personal digital assistant, a dedicated messaging device, or a portable game device), or may be implemented as a server.

FIG. 1 is a schematic structural diagram of a video special effect processing system according to an embodiment of this application. A terminal 400 is connected to a server 200 through a network 300. The network 300 may be a wide area network or a local area network, or a combination of the two.

The server 200 may be an independent physical server, or may be a server cluster including a plurality of physical servers or a distributed system, or may be a cloud server providing a cloud computing service. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid according to usage.

The following describes, with reference to different application scenarios, the application of the video special effect processing method provided in the embodiments of this application.

In an application scenario, a designer designs a video special effect file by using a terminal 500 or by calling a cloud service of a server, and sends the video special effect file to a server 200 (that is, a backend server) of a client. The server 200 stores the received video special effect file, or the server 200 stores the video special effect file in a database 600 or a file system. A user uses a client running in the terminal 400. The client may be various types of applications such as a game application, a social network application, a short video application, and an online shopping application. During use by the user, service logic of the server 200 to deliver a video is triggered. For example, the server 200 regularly delivers a service usage report, for example, service logic of delivering a weekly battle report video in a game and a monthly consumption video report is triggered, specific content of the service usage report being related to a service of the client. In addition, the server 200 is triggered to deliver a video special effect file for enhancing the expressiveness of a video. The video special effect file may be prestored by the client.

In some application scenarios, the client running in the terminal 400 uses a playback duration of a video delivered by the server 200 as a target playback duration based on a duration scaling policy in the video special effect file, and renders a special effect object (a video special effect) carried in the video special effect file while rendering the video, to obtain a target video special effect that conforms to the target playback duration, so as to achieve an effect of simultaneous display of the video special effect and the video. A specific process is as follows: In response to receiving a native video (e.g., a weekly battle report video) and a video special effect file returned from the server 200, the terminal 400 obtains a native video duration (e.g., a duration of the weekly battle report video) of the native video, uses the native video duration as a target playback duration, decodes the video special effect file, performs corresponding time scaling, so that a video special effect on which time scaling (e.g., time extension, reduction, compression, etc.) has been performed is adapted to a playback duration of the native video, finally renders the video special effect, and displays the video special effect and the native video simultaneously, to display the weekly battle report video with the video special effect.

In some application scenarios, the server delivers multiple videos, and video special effects serve as transition animations between the multiple videos, to play the multiple videos in series. A duration of the transition animation may be specified by the server during delivery of the video. For example, the duration of the transition animation may be determined according to a user account level (a higher level indicates a shorter transition time). When the client running in the terminal 400 finishes playing a video, a video special effect carried in a video special effect file is rendered, to obtain a target video special effect conforming to a target playback duration. The target video special effect actually achieves a function of a transition animation, to make connection between multiple videos more natural. A specific process is as follows: The terminal 400 obtains, from the server 200, a video special effect file corresponding to a video special effect for decoding, performs corresponding time scaling based on a specified target playback duration (a duration of the transition animation), and renders, between several native videos, the video special effect on which time scaling has been performed.

Playback durations of videos delivered by the server for different users or playback durations of different videos delivered by the server for the same user can be varied. The same video special effect file may be reused in play processes of many videos at the same time, reducing the consumption of computing resources for repeated video generation by the server, and reducing a waiting delay on a user side.

In another application scenario, the client running in the terminal 400 is a social network client, or a video sharing client, with video collection, editing, and sharing functions. The client collects a video, and uses a video special effect file downloaded from the server for synthesis, such as image stitching (both displayed at the same time) or timeline stitching (that is, using the video special effect file to bridge many collected videos). For the former, a playback duration of the video is used as a target playback duration, and a specific process is follows: In response to receiving a native video taken by a user, the terminal 400 obtains a native video duration of the native video. The terminal 400 obtains a video special effect file corresponding to a video special effect from the server 200 for decoding, to use the native video duration as a target playback duration, and performs corresponding time scaling for the video special effect, so that the video special effect is adapted to the native video. After image stitching is performed on the video special effect and the native video, real-time rendering is performed to preview a final editing effect. After the preview, an image stitching result may further be encoded, to obtain a new video file to share with another user. For the later, a duration set by the user or a default duration of a transition animation on the client is used as a target playback duration. After a video is played, a video special effect carried in a video special effect file is rendered, to obtain a target video special effect conforming to the target playback duration. The target video special effect actually achieves a function of the transition animation, to make connection between multiple videos more natural. A specific process is follows: The terminal 400 obtains a video special effect file corresponding to a video special effect from the server 200 for decoding, performs corresponding time scaling based on a specified target playback duration (a duration of the transition animation), renders, between several native videos, the video special effect on which time scaling has been performed, performs timeline stitching on the video special effect on which time scaling has been performed and the several native videos, and then performs encoding, to obtain a new video file to share with another user.

In the foregoing video editing scenario, the user may continue to adjust the target playback duration, and re-render the native video and the video special effect, until the user determines that a finally obtained preview result meets a requirement. The client (video editing client) performs encoding combining the native video and the video special effect file to obtain a complete video file, and can share the video file.

The function in the client for implementing a special effect processing function may be native to the client, or may be implemented by the client by implanting a corresponding plug-in such as an SDK. A specific form of implementing a video special effect in the client is not limited.

In addition, as an alternative solution to rendering in the client, when computing resources (processor and memory) consumed by the rendering exceeds a withstand capability of the terminal, the client may request the server to render, and present the target video special effect according to rendering data by returned by the server.

Figure 2:
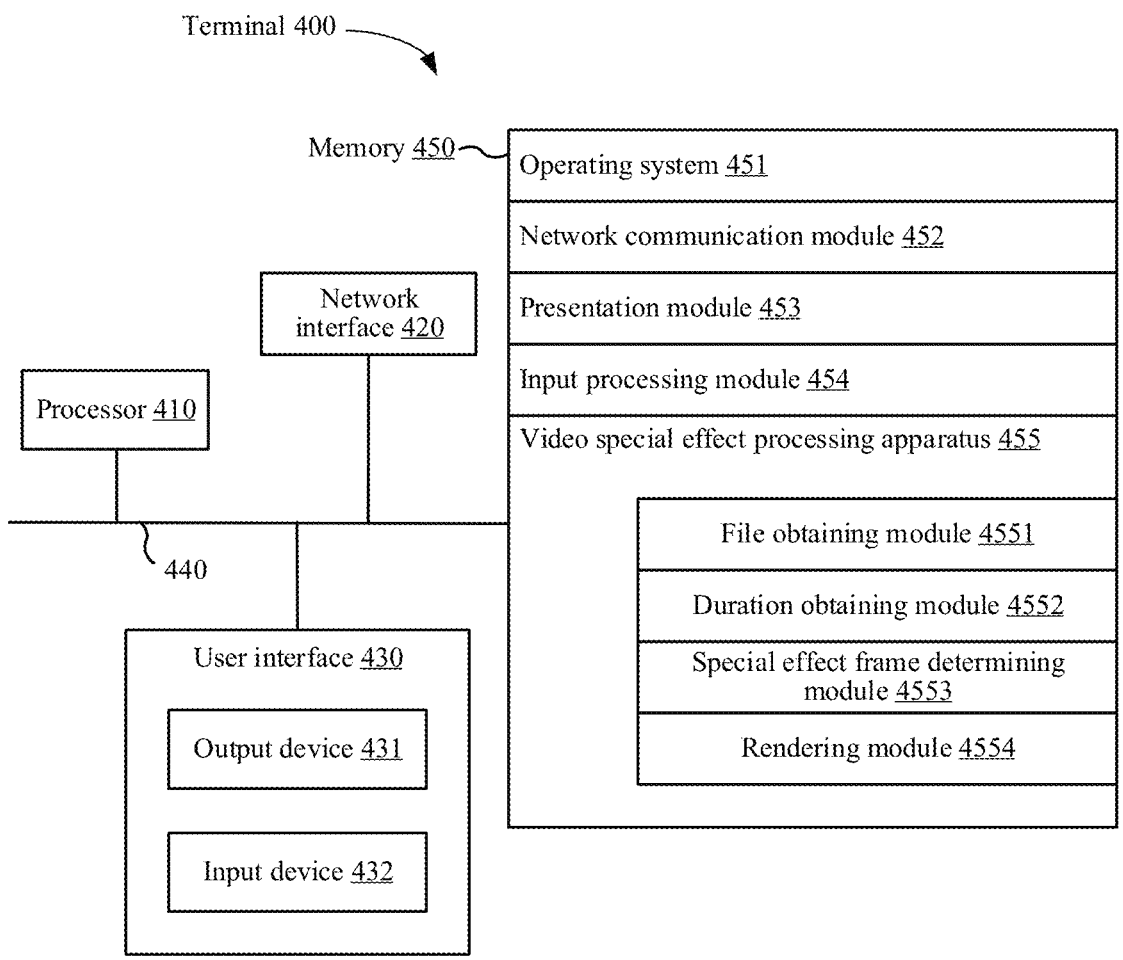
FIG. 2 is a schematic structural diagram of an electronic device according to an embodiment of this application.

The following provides a description still using an example in which the electronic device provided in the embodiments of this application is the terminal described above. FIG. 2 is a schematic structural diagram of an electronic device according to an embodiment of this application. A terminal 400 shown in FIG. 2 includes at least one processor 410, a memory 450, at least one network interface 420, and a user interface 430. All the components in the terminal 400 are coupled together by a bus system 440. It may be understood that the bus system 440 is configured to implement connection and communication between the components. In addition to a data bus, the bus system 440 further includes a power bus, a control bus, and a status signal bus. However, for ease of clear description, all types of buses are marked as the bus system 440 in FIG. 2.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that can display media content, including one or more loudspeakers and/or one or more visual display screens. The user interface 430 further includes one or more input devices 432, including a user interface component that facilitates user input, such as a keyboard, a mouse, a microphone, a touchscreen, a camera, and other input buttons and controls.

The memory 450 may be removable, non-removable, or a combination thereof. Exemplary hardware devices include a solid-state memory, a hard disk drive, an optical disc driver, or the like. In some embodiments, the memory 450 includes one or more storage devices that are physically located away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this application is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another electronic device through one or more (wired or wireless) network interfaces 420. Exemplary network interfaces 420 include: Bluetooth, wireless compatible authentication (WiFi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, a video special effect processing apparatus provided in an embodiment of this application may be implemented in a software manner. FIG. 2 shows a video special effect processing apparatus 455 stored in the memory 450. The apparatus may be software in the form of a program, a plug-in, or the like, including the following software modules: a file obtaining module 4551, a duration obtaining module 4552, a special effect frame determining module 4553, and a rendering module 4554. These modules are logical, and therefore, can be combined or further divided in any way depending on functions to be implemented.

The exemplary application and implementation of the video special effect processing method provided in the embodiments of this application in the terminal described above are to be described. The following is described from the perspective of the terminal. However, it may be understood that according to the description of the foregoing specific application scenario, related processing of a video special effect below may be completed by the client running in the terminal. Therefore, the terminal in the following may be specifically the client running in the terminal. An example of the client has been described above and no repetition is provided.

Figure 3A:
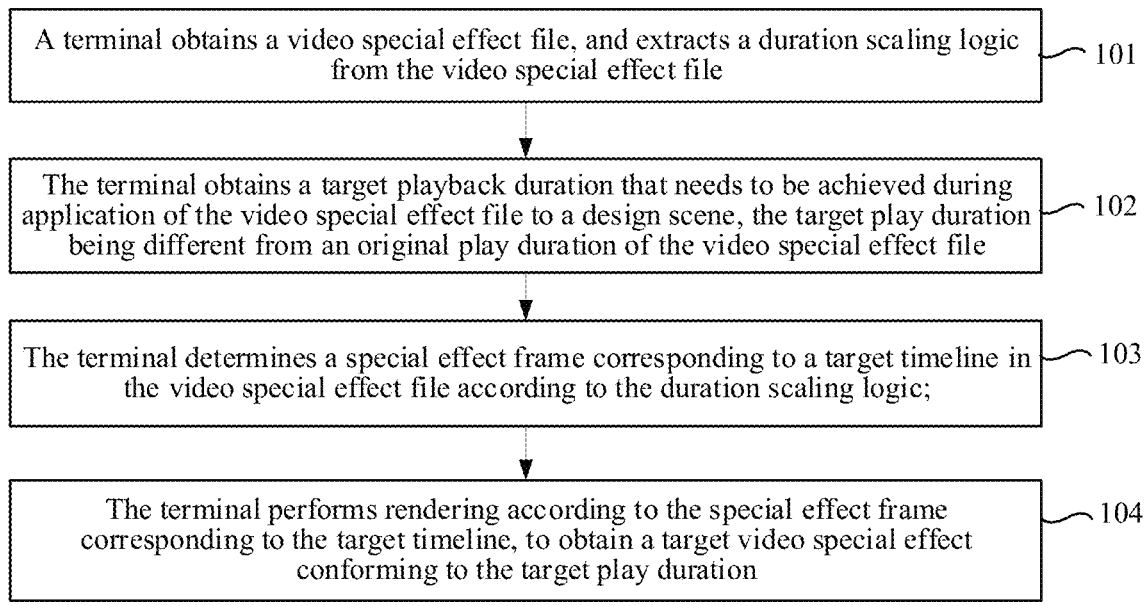
FIG. 3A to FIG. 3E are each a schematic flowchart of a video special effect processing method according to an embodiment of this application.

FIG. 3A is a schematic flowchart of a video special effect processing method according to an embodiment of this application. Description is to be provided with reference to steps shown in FIG. 3A.

Step 101. A terminal obtains a video special effect file, and extracts a duration scaling policy from the video special effect file.

In an example, a main manner of obtaining the video special effect file is to export the video special effect file through a plug-in. The video special effect file may be a sticker animation file in a PAG format. In order to read animation special effect data in a project file, one of a vector export manner, a bitmap sequence frame export manner, or a video sequence frame export manner may be selected according to a specific requirement to export a PAG binary file. A client or a server side decodes the exported PAG binary file. Herein, the terminal is used as an example for description, that is, the terminal decodes the exported PAG binary file, renders the file through a rendering module, and then presents the file. The process of decoding and presenting by the terminal may be implemented by calling a rendering SDK. The function of decoding is to deserialize the PAG binary file into a data object that can be operated by the client. For a structure of decoded data, refer to a structure of PAG data.

In some embodiments, step 101 of obtaining a video special effect file may be implemented through the following technical solution: performing one of the following processing operations: encoding multiple layer structures of a special effect object, to obtain an encoded export file corresponding to the special effect object; encoding multiple special effect frames of a special effect object, to obtain an encoded export file corresponding to the special effect object; or performing video format compression on multiple special effect frames of a special effect object, and encoding an obtained video format compression result, to obtain an encoded export file corresponding to the special effect object; and encapsulating a duration scaling type and a duration scaling interval in the encoded export file, to obtain a video special effect file corresponding to the special effect object.

In an example, first the encoded export file of the special effect object is obtained in one of the following three manners: vector export, bitmap sequence frame export, and video sequence frame export. The vector export manner can support most AE features, and an export file is very small, usually applied to a user interface or a scene with editable content. Vector export is the restoration of an AE animation layer structure. The vector export manner is to restore an AE animation layer structure through an SDK provided by AE, and a dynamic bit storage technology is used in the export process, significantly reducing a file size. The bitmap sequence frame export manner and the video sequence frame export manner can support all AE features. However, an export file is relatively large, usually applied to video composition or a scene with special requirements for animation special effects. The bitmap sequence frame export is bitmap data. The bitmap sequence frame export is to convert each frame in a complex animation effect designed by a designer into a picture format for storage. More specifically, in view of the characteristics of coherence and small difference between frames in most of AE animations, a particular frame is selected as a key frame, to be compared with each subsequent frame of data, to obtain location information and width and height data of the difference bitmap, and the difference bitmap information is intercepted and stored, thereby reducing the file size. In addition, the bitmap sequence frame supports exporting multiple versions (with different scaling factors, frame rates, and sizes), to meet requirements in different scenarios. Such a processing manner has an advantage of supporting all AE features and disadvantages of exporting a relatively large file and being incapable of implementing picture replacement and text editing operations on the AE animation, and is suitable for processing complex special effects such as masks and shadows and mainly applied to a web page side. The video sequence frame export manner uses the H.264 compression format in the video field, has a higher decoding speed than the bitmap sequence frame, and focuses on the application to the mobile terminal. The video sequence frame export manner performs video format compression on a captured picture. The video sequence frame export manner has a more optimized picture format size and more optimized decoding efficiency than the bitmap sequence frame export manner. In terms of performance, the vector export manner can achieve an optimized limit state in both file size and performance. For a PAG video special effect file generated in the sequence frame export manner, the overall time consumption is related only to a size of a sequence frame picture.

In an example, encapsulating a duration scaling type and a duration scaling interval input by a user in an encoded export file is actually modifying a data structure of a PAG sticker animation file. The duration scaling type and the duration scaling interval may be added at a root path level of the file, and a video special effect file corresponding to a special effect object is finally obtained. In a specific implementation process, an order of performing an encapsulation step and an encoding step may not be limited, that is, the duration scaling type and the duration scaling interval may be added at the root path level first, and then encoding export processing is performed in one of the foregoing three manners, or encoding export processing may be performed first, and then the duration scaling type and the duration scaling interval are added at the root path level.

Through the foregoing embodiment, the development procedure of designers designing animations through AE and then providing animation feature data to terminal development engineers to implement animation functions is reduced to a procedure in which designers design export PAG sticker animation files of animations through AE, and terminals directly load and display the PAG sticker animation files, that is, the workload of terminal development is greatly reduced, and development requirements of various platforms are all met.

In some embodiments, the duration scaling policy includes a duration scaling interval and a corresponding duration scaling type; and step 101 of extracting a duration scaling policy from the video special effect file may be implemented through the following technical solution: decoding the video special effect file to obtain at least one duration scaling interval corresponding to the video special effect file and a corresponding duration scaling type; the duration scaling type including any one of the following types: a time linear scaling type; a time repetition type; or a reversed time repetition type.

Figure 6A:
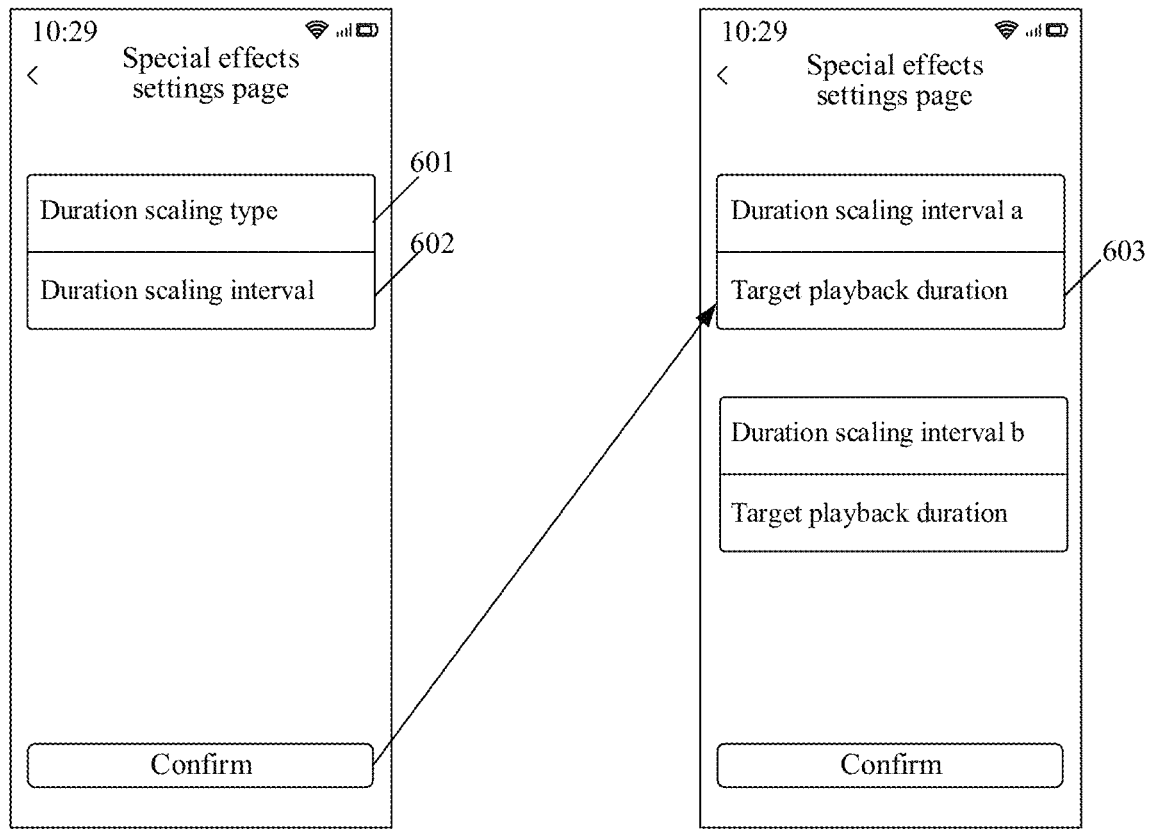
FIG. 6A to FIG. 6C are each a schematic diagram of annotations of a video special effect processing method according to an embodiment of this application.
Figure 6B:
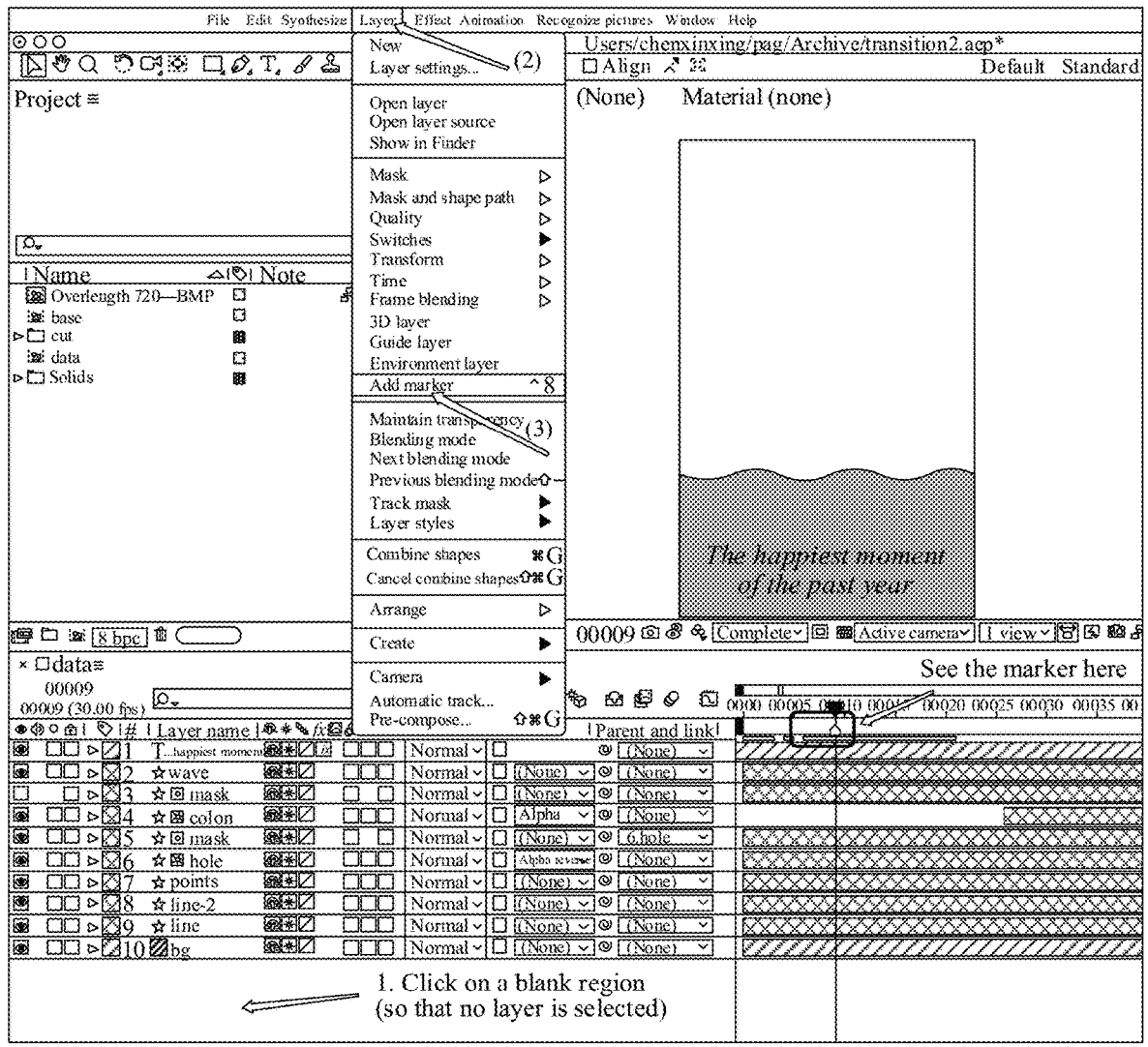
Figure 6C:
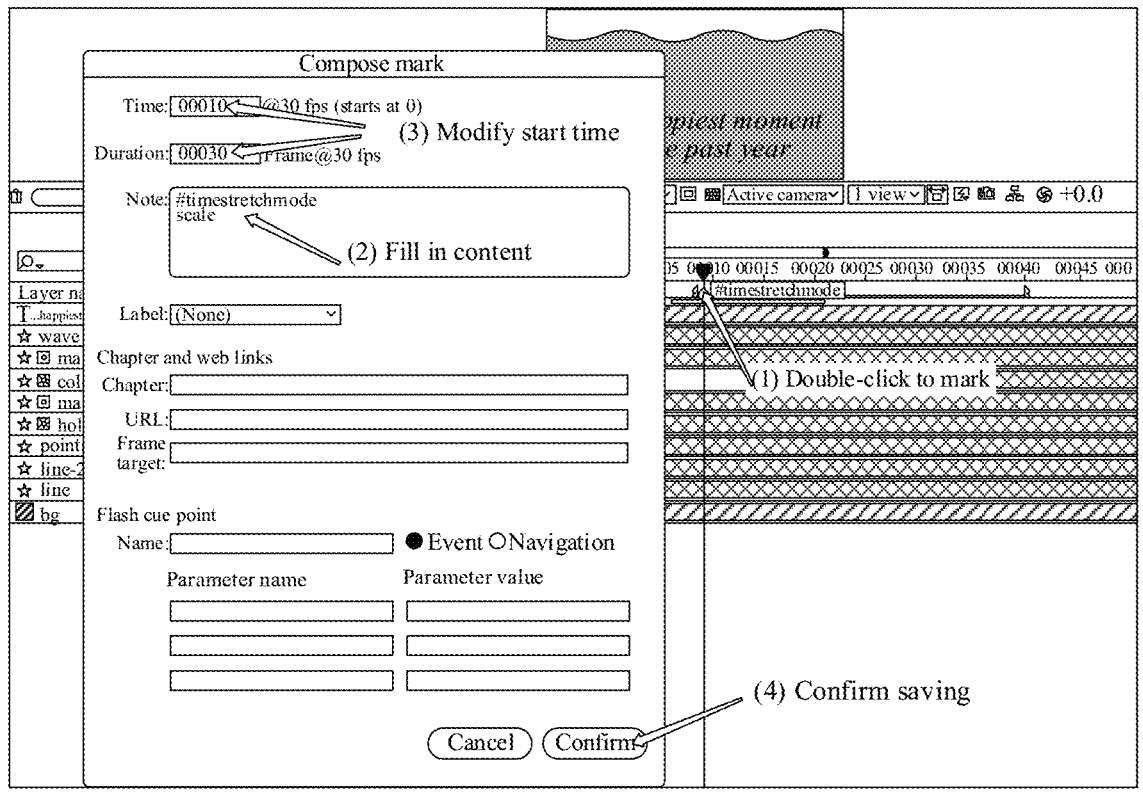

In an example, the video special effect file may be the foregoing PAG sticker animation file, and is a description file for the special effect object. A duration scaling interval based on a user configuration and a corresponding duration scaling type may be extracted after decoding. A quantity of the at least one duration scaling interval is usually one. However, in a relatively complex application scenario, the quantity of the at least one duration scaling interval is multiple. For each duration scaling interval, there is a corresponding user-configured duration scaling type. For a user-configured function, the terminal may provide a configuration portal for the user, and receive a duration scaling interval and a duration scaling type input by the user. FIG. 6A is a schematic diagram of annotations of a video special effect processing method according to an embodiment of this application. That is, the duration scaling interval and the duration scaling type input by the user are received through configuration portals 601 and 602 provided by the client in each application scenario. After the duration scaling policy is received, a page jump may also occur, to continue to receive an inputted target playback duration corresponding to each duration scaling interval. Alternatively, after a duration scaling policy is set, received configuration information is sent to an AE client through inter-process communication, to perform encoding with reference to special effect data obtained from the AE client, to obtain a final video special effect file. A configuration portal 603 of a target playback duration is provided after the scaling policy is extracted from the video special effect file. Such an implementation can help a client in any application scenario flexibly set a scaling policy of an animation special effect file, and can also label the duration scaling interval and the duration scaling type through the AE client. FIG. 6B to FIG. 6C are each a schematic diagram of annotations of a video special effect processing method according to an embodiment of this application. That is, a duration scaling interval and a duration scaling type input by a user are received directly through an AE client, to perform encoding with reference to special effect data obtained from the AE client, to obtain a final video special effect file. Such an implementation can alleviate development and optimization tasks of clients in various application scenarios, and a rendering SDK can be directly called on each client side to obtain a video special effect file and execute subsequent logic.

Step 102. Obtain a target playback duration that needs to be achieved during application of the video special effect file to a design scene, the target playback duration being different from an original playback duration of the video special effect file.

Figure 3B:
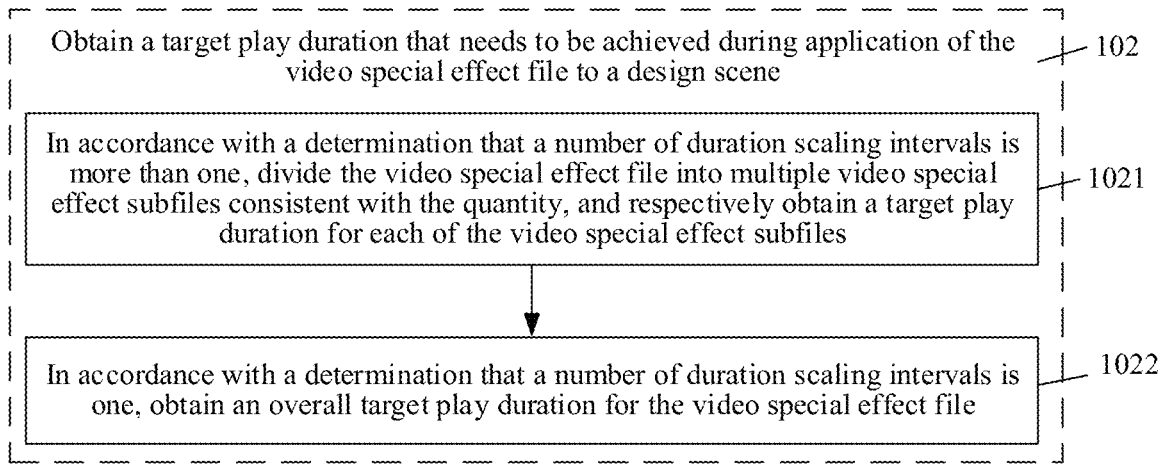

Based on FIG. 3A, FIG. 3B is an schematic flowchart of a video special effect processing method according to an embodiment of this application. Step 102 of obtaining a target playback duration that needs to be achieved during application of the video special effect file to a design scene may be implemented through step 1021 to step 1022. This is to be described with reference to the steps.

Step 1021. In accordance with a determination that a number of the at least one duration scaling interval is more than one, divide the video special effect file into multiple video special effect subfiles consistent with the quantity, and respectively obtain a target playback duration for each of the video special effect subfiles.

In an example, a manner of dividing the video special effect file is not limited in an implementation process, provided that it is ensured that each video special effect subfile obtained after division includes one and only one duration scaling interval, and a target playback duration of each duration scaling interval may be obtained through allocation of the target playback duration of the video special effect file. For example, the target playback duration of the video special effect file is 10 seconds, and there are two duration scaling intervals in the video special effect file: a first duration scaling interval of one second to two second and a second duration scaling interval of three seconds to four seconds. In this case, for a first target playback duration of the first duration scaling interval, it only needs to be ensured that a second target playback duration in combination with the corresponding second duration scaling interval conforms to the target playback duration of the video special effect file. That is, if a first duration scaling type is a repetition type, the first target playback duration is at least greater than two seconds (for example, three seconds), and a sum of the first target playback duration and the second target playback duration is 10 seconds. Such an implementation has fewer restrictions. That is, it is only restricted that a sum of target playback durations of the corresponding subfiles is the target playback duration of the video special effect file, and the target playback duration of each subfile conforms to the corresponding duration scaling interval. In this way, the trouble of setting by the user is avoided without the need for human intervention of the user, thereby providing diversified and random rendering effects.

In an example, the target playback duration of each video special effect subfile actually involves an allocation problem of the target playback duration of the video special effect file. During allocation, in addition to arbitrary allocation according to the constraints of the foregoing restrictions, an allocation solution configuration function may further be provided for the user. In the user configuration portal in FIG. 6C, a related portal may further be provided to help the user input the target playback duration configured for each duration scaling interval. For example, the user sets the target playback duration of the video special effect subfile corresponding to the each duration scaling interval. Such an implementation helps the user flexibly control a rendering effect of each subfile in a finer-granularity manner and further control a rendering effect of the entire file.

In an example, in accordance with a determination that a number (e.g., quantity) of the at least one duration scaling interval is greater than one, and there is a native video that needs to be adapted and presented with the special effect object, a duration of the native video may be directly used as the target playback duration corresponding to the video special effect file, and the duration of the native video is allocated for different scaling intervals, so that the target playback duration of the each scaling interval meets the foregoing constraints. If the allocated target playback duration cannot be adapted to the duration scaling type in the duration scaling policy of the corresponding video special effect subfile, for example, the duration scaling type is the time repetition type, but the target playback duration is less than the original playback duration, another video special effect file is selected, and in a material library, there may be video special effect files with the same special effect object corresponding to different duration scaling policies.

Step 1022. In accordance with a determination that a quantity of the at least one duration scaling interval is one, obtain an overall target playback duration for the video special effect file.

In an example, in accordance with a determination that the quantity of the at least one duration scaling interval is one, the target playback duration of the video special effect file does not need to be allocated, and the target playback duration configured by the user is directly used as the overall target playback duration of the video special effect file. In accordance with a determination that the target playback duration input by the user does not conform to the duration scaling type of the duration scaling interval, error prompt information is returned to the user, and the portal is opened again for receiving the target playback duration input by the user.

In an example, in accordance with a determination that the quantity of the at least one duration scaling interval is one, and there is a native video that needs to be adapted and presented with the special effect object, a duration of the native video may be directly used as a target playback duration of a special effect. If the duration of the native video does not conform to the duration scaling type in the duration scaling policy of the corresponding special effect file, another video special effect file is selected, and in a material library, there may be video special effect files with the same special effect object corresponding to different duration scaling policies.

Requirements for the target playback duration are various in different application scenarios, and the same video special effect file may be reused in play processes and editing processes of many videos at the same time. Therefore, the consumption of computing resources for repeated video generation by the server can be reduced, thereby reducing a waiting delay on a user side.

In some embodiments, after step 102 of obtaining a target playback duration that needs to be achieved during application of the video special effect file to a design scene is performed, the following technical solution may further be performed: in accordance with a determination that a quantity of the at least one duration scaling interval is more than one (e.g., 2, 3, 5, etc.), performing the following processing operations for each of the video special effect subfiles: obtaining an original timeline corresponding to a special effect object from a timeline of the video special effect subfile, that is, a partial timeline of the special effect object occurring in the timeline of the subfile; maintaining a frame rate of the original timeline unchanged, and performing duration scaling on the original timeline to obtain a target timeline corresponding to the target playback duration; or in accordance with a determination that a quantity of the at least one duration scaling interval is one, performing the following processing operations for the video special effect file: obtaining an original timeline corresponding to a special effect object from the video special effect file; and maintaining a frame rate of the original timeline unchanged, and perform duration scaling on the original timeline to obtain a target timeline corresponding to the target playback duration.

In an example, in accordance with a determination that the quantity of the at least one duration scaling interval is more than one, a part that is of the timeline of the video special effect subfile and in which the special effect object occurs is used as an original timeline. A frame rate of the original timeline is maintained unchanged, and duration scaling is performed on the original timeline to obtain a target timeline corresponding to the target playback duration. In accordance with a determination that the quantity of the at least one duration scaling interval is one, duration scaling is directly performed on the original timeline corresponding to the special effect object in the video special effect file, to obtain a target timeline corresponding to the target playback duration. During the scaling in the foregoing two cases, the frame rate is maintained unchanged, that is, a minimum time unit is maintained unchanged, so that the effect of the time scaling of the special effect object is that a play progress instead of a play frame rate changes.

Step 103. The terminal determines a special effect frame corresponding to a target timeline in the video special effect file according to the duration scaling policy; a length of the target timeline being consistent with the target playback duration.

Figure 3C:
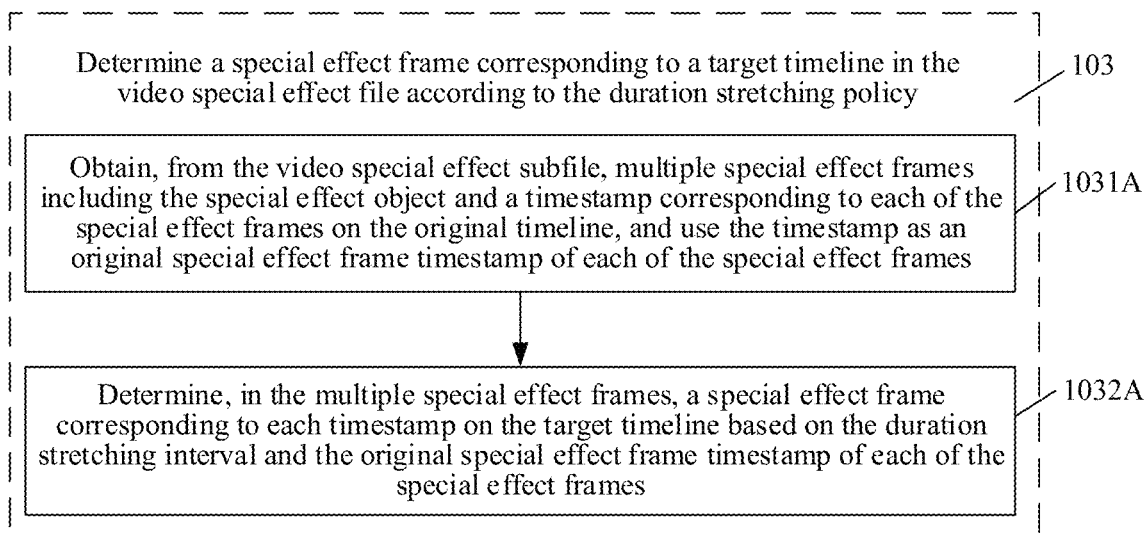

Based on FIG. 3A, FIG. 3C is a schematic flowchart of a video special effect processing method according to an embodiment of this application. In accordance with a determination that a quantity of the at least one duration scaling interval is multiple (i.e., more than one), step 103 of determining a special effect frame corresponding to a target timeline in the video special effect file according to the duration scaling policy may be implemented through performing step 1031A to step 1032A for each duration scaling interval. This is to be described with reference to the steps.

Step 1031A. Obtain, from the video special effect subfile, multiple special effect frames including the special effect object and a timestamp corresponding to each of the special effect frames on the original timeline, and use the timestamp as an original special effect frame timestamp of each of the special effect frames.

In an example, when no duration scaling is required, dependent rendering logic is the timestamp corresponding to each special effect frame in the video special effect subfile on the original timeline. For example, there are a special effect frame 1 to a special effect frame 24, with a frame rate is 24 frames per second, that is, every $1/24$ second is one timestamp, for example 0, $1/24$, $2/24$, . . . , and $23/24$. The special effect frames 1 to 24 are respectively presented on the 24 timestamps. The foregoing timestamps 0, $1/24$, $2/24$, . . . , and $23/24$ are respectively original special effect frame timestamps of the special effect frame 1 to the special effect frame 24.

Step 1032A. Determine, in the multiple special effect frames, a special effect frame corresponding to each timestamp on the target timeline based on the duration scaling interval and the original special effect frame timestamp of each of the special effect frames.

In an example, the process of performing duration scaling is actually determining a special effect frame corresponding to each timestamp on the target timeline. It is assumed that the original timeline is one second, with a frame rate of 24 frames per second, that is, every $1/24$ second is one timestamp, and the target timeline is two seconds, with a frame rate still of 24 frames per second. In this case, timestamps on the target timeline are 0, 1/24, 2/24, ..., 23/24, 24/24, ..., and 47/24. During scaling, a mapping relationship between the timestamps on the target timeline and timestamps on the original timeline and a mapping range may be determined based on the duration scaling interval and the corresponding duration scaling type, so that a timestamp on the original timeline that corresponds to each timestamp on the target timeline is determined based on the mapping relationship and the mapping range. Some of the corresponding timestamps on the original timeline are original special effect frame timestamps, and some timestamps present no special effect frame. For example, when a timestamp on the target timeline is 1/48, a corresponding timestamp on the original timeline presents no special effect frame, and a principle of proximity is used for the timestamp that presents no special effect frame, to determine a special effect frame that needs to be presented.

Figure 3D:
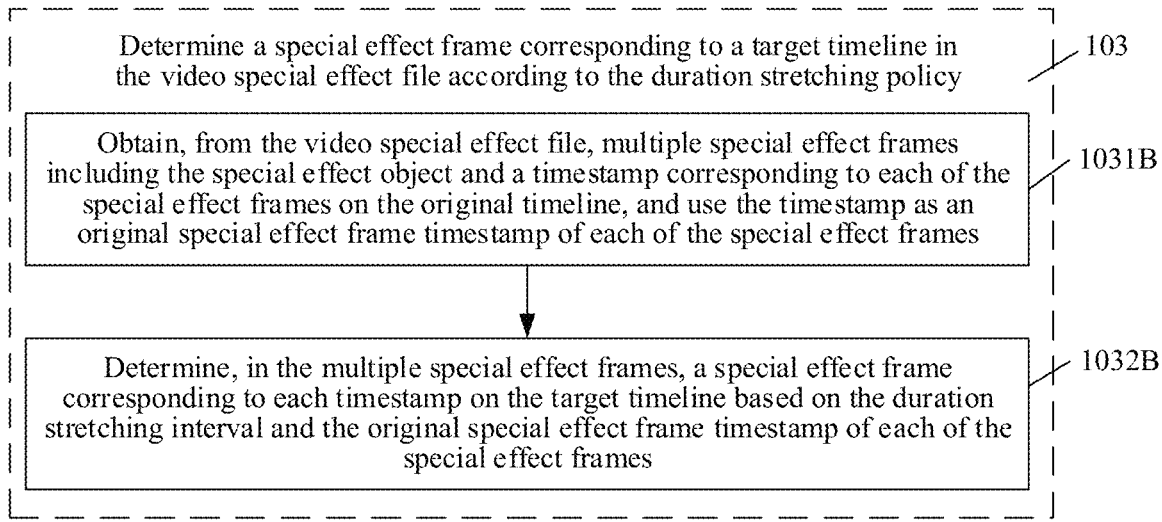

Based on FIG. 3A, FIG. 3D is a schematic flowchart of a video special effect processing method according to an embodiment of this application. In accordance with a determination that a quantity of the at least one duration scaling interval is one, step 103 of determining a special effect frame corresponding to a target timeline in the video special effect file according to the duration scaling policy may be implemented through step 1031B to step 1032B. This is to be described with reference to the steps.

Step 1031B. Obtain, from the video special effect file, multiple special effect frames including the special effect object and a timestamp corresponding to each of the special effect frames on the original timeline, and use the timestamp as an original special effect frame timestamp of each of the special effect frames.

In an example, when no duration scaling is required, dependent rendering logic is the timestamp corresponding to each special effect frame in the video special effect file on the original timeline. For example, there are a special effect frame 1 to a special effect frame 24, with a frame rate of 24 frames per second, that is, every 1/24 second is one timestamp, for example 0, 1/24, 2/24, ..., and 23/24. The special effect frames 1 to 24 are respectively presented on the 24 timestamps. The foregoing timestamps 0, 1/24, 2/24, ..., and 23/24 are respectively original special effect frame timestamps of the special effect frame 1 to the special effect frame 24.

Step 1032B. Determine, in the multiple special effect frames, a special effect frame corresponding to each timestamp on the target timeline based on the duration scaling interval and the original special effect frame timestamp of each of the special effect frames.

In an example, the process of performing duration scaling is actually determining a special effect frame corresponding to each timestamp on the target timeline. It is assumed that the original timeline is one second, with a frame rate of 24 frames per second, that is, every 1/24 second is one timestamp, and the target timeline is two seconds, with a frame rate still of 24 frames per second. In this case, timestamps on the target timeline are 0, 1/24, 2/24, ..., 23/24, 24/24, ..., and 47/24. During scaling, a mapping relationship between the timestamps on the target timeline and timestamps on the original timeline and a mapping range may be determined based on the duration scaling interval and the corresponding duration scaling type, so that a timestamp on the original timeline that corresponds to each timestamp on the target timeline is determined based on the mapping relationship and the mapping range. Some of the corresponding timestamps on the original timeline are original special effect frame timestamps, and some timestamps present no special effect frame. For example, when a timestamp on the target timeline is 1/48, a corresponding timestamp on the original timeline presents no special effect frame, and a principle of proximity is used for the timestamp that presents no special effect frame, to determine a special effect frame that needs to be presented.

In some embodiments, step 1032A or step 1032B of determining, in the multiple special effect frames, a special effect frame corresponding to each timestamp on the target timeline based on the duration scaling interval and the original special effect frame timestamp of each of the special effect frames may be implemented through the following technical solution: sequentially using the each timestamp on the target timeline as a target timestamp, and performing the following processing operations: determining a corresponding original timestamp of the target timestamp on the original timeline based on the duration scaling interval; and in accordance with a determination that the corresponding original timestamp of the target timestamp on the original timeline overlaps any of the original special effect frame timestamps, determining a special effect frame corresponding to the overlapping original special effect frame timestamp as a special effect frame corresponding to the target timestamp; or in accordance with a determination that the corresponding original timestamp of the target timestamp on the original timeline does not overlap any of the original special effect frame timestamps, determining an original special effect frame timestamp with a smallest distance from the original timestamp, and determining a special effect frame corresponding to the original special effect frame timestamp as a special effect frame corresponding to the target timestamp.

In an example, it is assumed that the original timeline is one second, with a frame rate of 24 frames per second, that is, every 1/24 second is one timestamp, and there are a special effect frame 1 to a special effect frame 24, with a frame rate of 24 frames per second, that is, every 1/24 second is one timestamp, for example, 0, 1/24, 2/24, ..., and 23/24. The special effect frames 1 to 24 are respectively presented on the 24 timestamps. The foregoing timestamps 0, 1/24, 2/24, ..., and 23/24 are respectively original special effect frame timestamps of the special effect frame 1 to the special effect frame 24, and the target timeline is two seconds, with a frame rate still of 24 frames per second. In this case, all timestamps on the target timeline are 0, 1/24, 2/24, ..., 23/24, 24/24, ..., and 47/24. All the timestamps on the target timeline are used as target timestamps, original special effect frame timestamps corresponding to the target timestamps are determined, and the original special effect frame timestamps respectively corresponding to the target timestamps are 0, 0, 1/24, 1/24, 2/24, 2/24, ..., 23/24, and 23/24. Because the corresponding original timestamps of the target timestamps on the original timeline overlap the original special effect frame timestamps, special effect frames corresponding to these original special effect frame timestamps are respectively determined as special effect frames on the target timestamps. In this case, all the timestamps on the target timeline are 0, 1/24, 2/24, ..., 23/24, 24/24, ..., and 47/24, and the special effect frames respectively corresponding to the target timestamps are the special effect frame 1, the special effect frame 1, ..., the special effect frame 24, and the special effect frame 24. However, such a transformation is an ideal transformation. In some cases, not all original timestamps on the original timeline that correspond to all the target timestamps on the target timeline are original special effect frame timestamps. For example, it is assumed that an original timestamp corresponding to the target timestamp 1/24 on the original timeline is 1/48. However, when the frame rate is 24 frames per second, the original timestamp ⅟₄₈ on the original timeline has no corresponding special effect frame. Therefore, the principle of proximity is used, and a special effect frame A with a closest time distance as a special effect frame of the original timestamp ⅟₄₈, and then determined as a special effect frame corresponding to the target timestamp ⅟₂₄. For the reason that there are two timestamps with a closest distance, the special effect frame A herein may be a special effect frame on the original timestamp 0, or may be a special effect frame of the original timestamp ⅟₂₄. If an original timestamp corresponding to the target timestamp ⅟₂₄ on the original timeline is ⅟₃₆, a timestamp closest to the target timestamp ⅟₂₄ (the original timestamp) is the original timestamp ⅟₂₄. The special effect frame A herein is the special effect frame of the timestamp ⅟₂₄.

In some embodiments, the foregoing determining a corresponding original timestamp of the target timestamp on the original timeline based on the duration scaling interval may be implemented through the following technical solution: performing the following processing operation for each of the duration scaling intervals: in accordance with a determination that the target timestamp is not greater than a start timestamp of the duration scaling interval, determining the target timestamp as a corresponding original timestamp on the original timeline; or in accordance with a determination that the target timestamp is greater than a start timestamp of the duration scaling interval and less than an end timestamp of the duration scaling interval, mapping the target timestamp based on the duration scaling type to obtain a corresponding original timestamp; or in accordance with a determination that the target timestamp is greater than or equal to an end timestamp and less than the target playback duration, determining a first difference between the original playback duration and the target playback duration, performing summation the first difference and the target timestamp, and determining a summation result as the corresponding original timestamp of the target timestamp on the original timeline.

Figure 7:
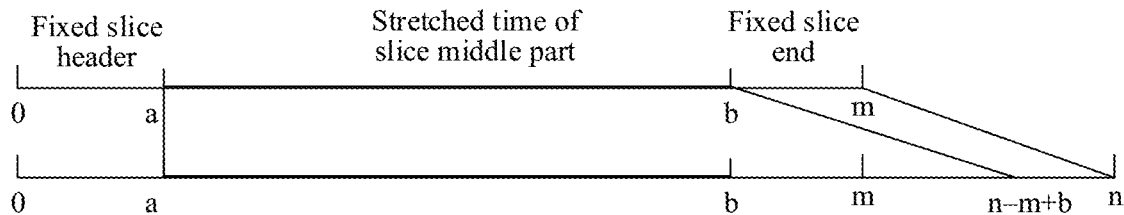
FIG. 7 is a schematic diagram of a timeline of a video special effect processing method according to an embodiment of this application.

In an example, the duration scaling interval in the duration scaling policy already defines an interval that needs to be stretched. Therefore, for different timestamps on the target timeline, corresponding original timestamps on the original timeline are obtained through mapping according to different mapping relationships. Referring to FIG. 7, a length of the original timeline is m, a length of the target timeline is n, a duration scaling interval is from a to b, and a length of the duration scaling interval is b−a. After duration scaling, the start timestamp of the duration scaling interval is a, and the end timestamp is n−(m−b). If the target timestamp t falls between 0 and a, the corresponding timestamp on the original timeline is also t. Because this time period belongs to an interval with a fixed slice header, if the target timestamp t falls between n−(m−b) and n, the corresponding timestamp on the original timeline is m−n+t, or if the target timestamp t falls between a and n−m+b, mapping needs to be performed according to different duration scaling types.

In some embodiments, the foregoing mapping the target timestamp based on the duration scaling type to obtain a corresponding original timestamp may be implemented through the following technical solution: in accordance with a determination that the duration scaling type is the time linear scaling type, determining a second difference between the target playback duration and the original playback duration as a scaling length, and performing summation on the scaling length and a length of the duration scaling interval; performing ratio calculation on the length of the duration scaling interval and a summation result to obtain a scaling factor; determining a third difference between the target timestamp and the start timestamp, and multiplying the third difference and the scaling factor together; and performing summation on a multiplication result and the start timestamp to obtain the corresponding original timestamp.

In an example, when a target timestamp t falls between a and n−m+b, mapping needs to be performed according to different duration scaling types. If the duration scaling type is time linear scaling, a second difference between a target playback duration n and an original playback duration m is determined as a scaling length, and summation is performed on the scaling length and a length b−a of the duration scaling interval. Ratio calculation is performed on the length b−a of the duration scaling interval and a summation result to obtain a scaling factor k. A third difference between the target timestamp t and the start timestamp a is determined, and the third difference and the scaling factor k are multiplied together. Summation is performed on a multiplication result and the start timestamp a to obtain the corresponding original timestamp. For a specific calculation principle, refer to the following formula (1):

$$f(t)=a+k(t-a), a<t<n-m+b \qquad (1);$$

where a is the start timestamp, t is the target timestamp, k is the scaling factor, f(t) is the original timestamp, n is the target playback duration, and m is the original playback duration.

In some embodiments, the foregoing mapping the target timestamp based on the duration scaling type to obtain a corresponding original timestamp may be implemented through the following technical solution: in accordance with a determination that the duration scaling type is the time repetition type, determining a fourth difference between the target timestamp and the start timestamp, and performing remainder calculation on the fourth difference and the length of the duration scaling interval; and performing summation on a remainder calculation result and the start timestamp to obtain the corresponding original timestamp.

In an example, when a target timestamp t falls between a and n−m+b, mapping needs to be performed according to different duration scaling types. If the duration scaling type is the time repetition type, a fourth difference between the target timestamp t and the start timestamp a is determined, and remainder calculation is performed on the fourth difference and a length (b−a) of the duration scaling interval. Summation (e.g., addition) is performed on a remainder calculation result and the start timestamp a to obtain the corresponding original timestamp. For a specific calculation principle, refer to the following formula (2):

$$f(t)=a+(t-a)\%(b-a), a<t<n-m+b \qquad (2);$$

where a is the start timestamp, t is the target timestamp, k is the scaling factor, f(t) is the original timestamp, n is the target playback duration, and m is the original playback duration.

In some embodiments, the foregoing mapping the target timestamp based on the duration scaling type to obtain a corresponding original timestamp may be implemented through the following technical solution: in accordance with a determination that the duration scaling type is the reversed time repetition type, determining a fifth difference between the target timestamp and the start timestamp; performing remainder calculation on the fifth difference and the length of the duration scaling interval to obtain a remainder calculation result, and performing ratio calculation on the fifth difference and the length of the duration scaling interval to obtain a ratio result; rounding up the ratio result to obtain a rounding result; and in accordance with a determination that the rounding result is an even number, performing summation on the remainder calculation result and the start timestamp to obtain the corresponding original timestamp; or in accordance with a determination that the rounding result is an odd number, determining a sixth difference between the length of the duration scaling interval and the remainder calculation result, and performing summation on the sixth difference and the start timestamp to obtain the corresponding original timestamp.

In an example, when a target timestamp t falls between a and n−m+b, mapping needs to be performed according to different duration scaling types. If the duration scaling type is a reversed time repetition type, a fifth difference between the target timestamp t and the start timestamp a is determined, and remainder calculation is performed on the fifth difference and a length (b−a) of the duration scaling interval. For example, if remainder calculation is performed on 8 and 3, an obtained remainder calculation result is 2, a corresponding ratio result is 8/3, and a rounding result obtained after rounding processing is 2. The ratio result corresponding the remainder calculation result is rounded up to obtain a rounding result. In accordance with a determination that the rounding result is an even number, summation is performed on the remainder calculation result and the start timestamp a to obtain the corresponding original timestamp. In accordance with a determination that the rounding result is an odd number, a sixth difference between the length (b−a) of the duration scaling interval and the remainder calculation result is determined, and summation is performed on the sixth difference and the start timestamp a to obtain the corresponding original timestamp. For a specific calculation principle, refer to the following formula (3):

$$f(t)=a+(t-a)\%(b-a), a<t<n-m+b \quad (3);$$

where a is the start timestamp, t is the target timestamp, k is the scaling factor, f(t) is the original timestamp, n is the target playback duration, and m is the original playback duration.

Step 104. The terminal performs rendering according to the special effect frame corresponding to the target timeline, to obtain a target video special effect conforming to the target playback duration.

In an example, the terminal performs rendering on the corresponding timestamp according to a special effect frame of each timestamp on the target timeline, to obtain the target video special effect conforming to the target playback duration.

In an example, in a short video editing scenario, in response to receiving a native video captured by the user or a native video returned from the server, the terminal obtains a native video duration of the native video. The terminal decodes a video special effect file corresponding to a particular special effect object in the material library and performs corresponding duration scaling, and uses the native video duration as the target playback duration, so that the special effect is adapted to the native video. The special effect and the native video are stitched and then may be rendered in real time as a preview of a final effect. After the preview, a stitching result is encoded to obtain a new video file to be shared with another user.

In an example, in a short video editing scenario, special effects in the video special effect file may alternatively be used as connection animations between several native videos. The terminal decodes a video special effect file corresponding to a particular special effect object in the material library, receives a setting operation for the target playback duration, and performs corresponding duration scaling, so that a special effect object on which duration scaling has been performed is located between the several native videos. The special effect object and the native videos are timeline-stitched and then may be rendered in real time as a preview of a final effect. After the preview, a stitching result is encoded to obtain a new video file to be shared with another user.

In an example, in a scenario involving no file sharing, for example, in a game battle report scenario, in response to receiving a native video and a video special effect file returned from the server, the terminal obtains a native video duration of the native video, decodes the video special effect file, performs corresponding duration scaling, and uses the native video duration as the target playback duration, so that the special effect object is adapted to the playback duration of the native video. The special effect object and the native video are rendered and displayed at the same time.

Figure 3E:
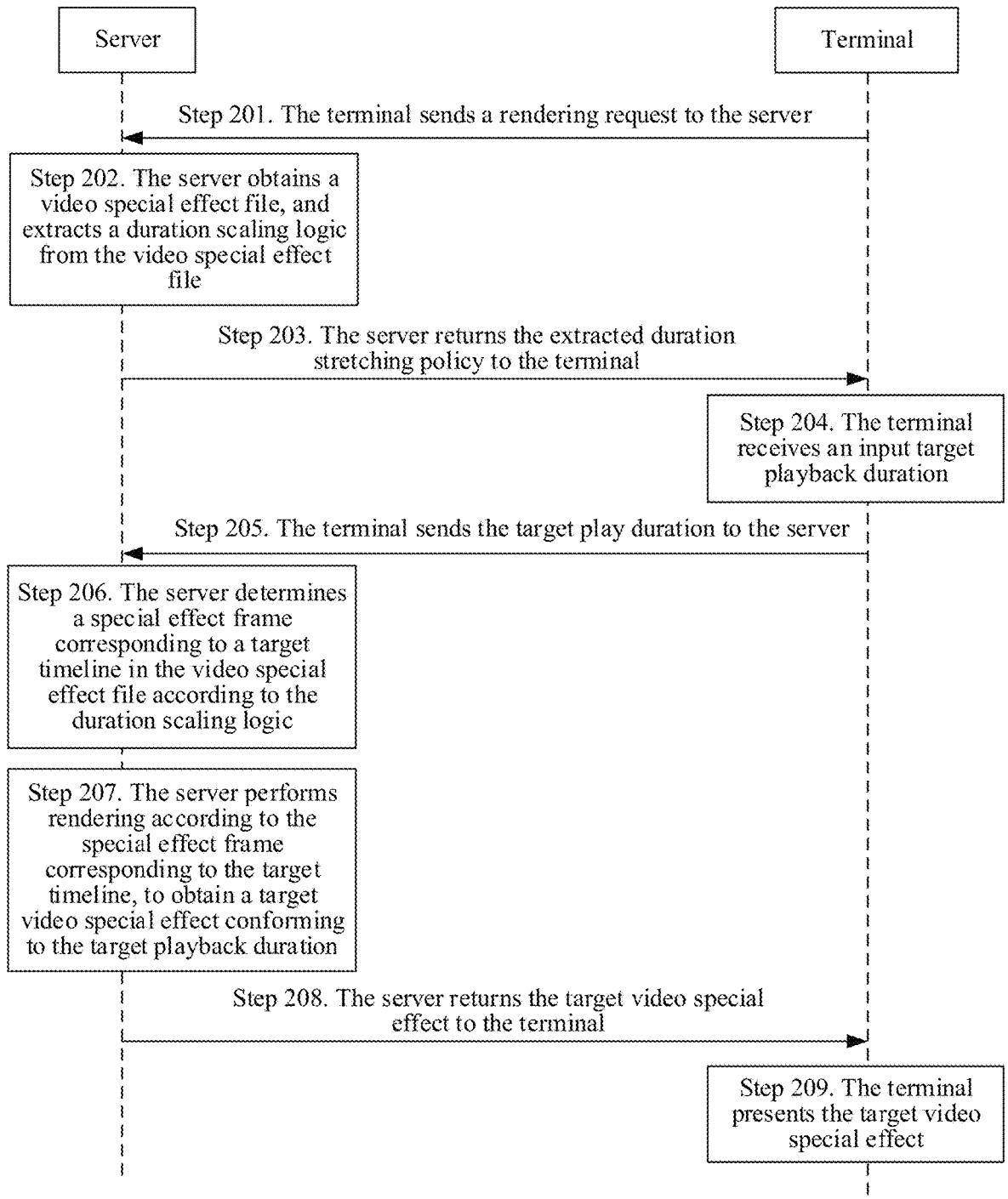

FIG. 3E is a schematic flowchart of a video special effect processing method according to an embodiment of this application. In the foregoing embodiment, the specific processing procedure is performed only by the terminal during implementation. In addition to this, the foregoing processing procedure may further be implemented in combination with the terminal and the server. In step 201, the terminal sends a rendering request to the server. In step 202, the server obtains a video special effect file, and extracts a duration scaling policy from the video special effect file. In step 203, the server returns the extracted duration scaling policy to the terminal. In step 204, the terminal receives an inputted target playback duration. In step 205, the terminal sends the target playback duration to the server. In step 206, the server determines a special effect frame corresponding to a target timeline in the video special effect file according to the duration scaling policy. In step 207, the server performs rendering according to the special effect frame corresponding to the target timeline, to obtain a target video special effect conforming to the target playback duration. In step 208, the server returns the target video special effect to the terminal. In step 209, the terminal presents the target video special effect. The foregoing process involves an interaction process between the terminal and the server. The rendering processing that requires a lot of computing resources is allocated to the server to complete, and the terminal is responsible only for receiving a configuration requirement of the user and presenting a video special effect obtained through rendering. In other implementations, the logic completed by the server may alternatively be completed by calling a rendering SDK, or completed by remotely calling cloud server resources through the rendering SDK.

The embodiments of this application provide a video special effect processing method that can support time scaling of a fixed animation file. In addition, an external application platform only needs to set a target play time of the animation file, and the animation file can be time-scaled according to a user-configured scaling policy. Playback duration scaling processing of a video special effect file is controlled by a duration scaling policy in the video special effect file. The video special effect file is processed and rendered according to the duration scaling policy after being decoded, so that a target video special effect of a target playback duration can be achieved. This can be directly applied to various applications and various platforms, without being limited by operating systems of the platforms, providing an extremely simple implementation procedure.

The following describes an exemplary application of the video special effect processing method provided in the embodiments of this application in an actual application scenario.

Figure 4:
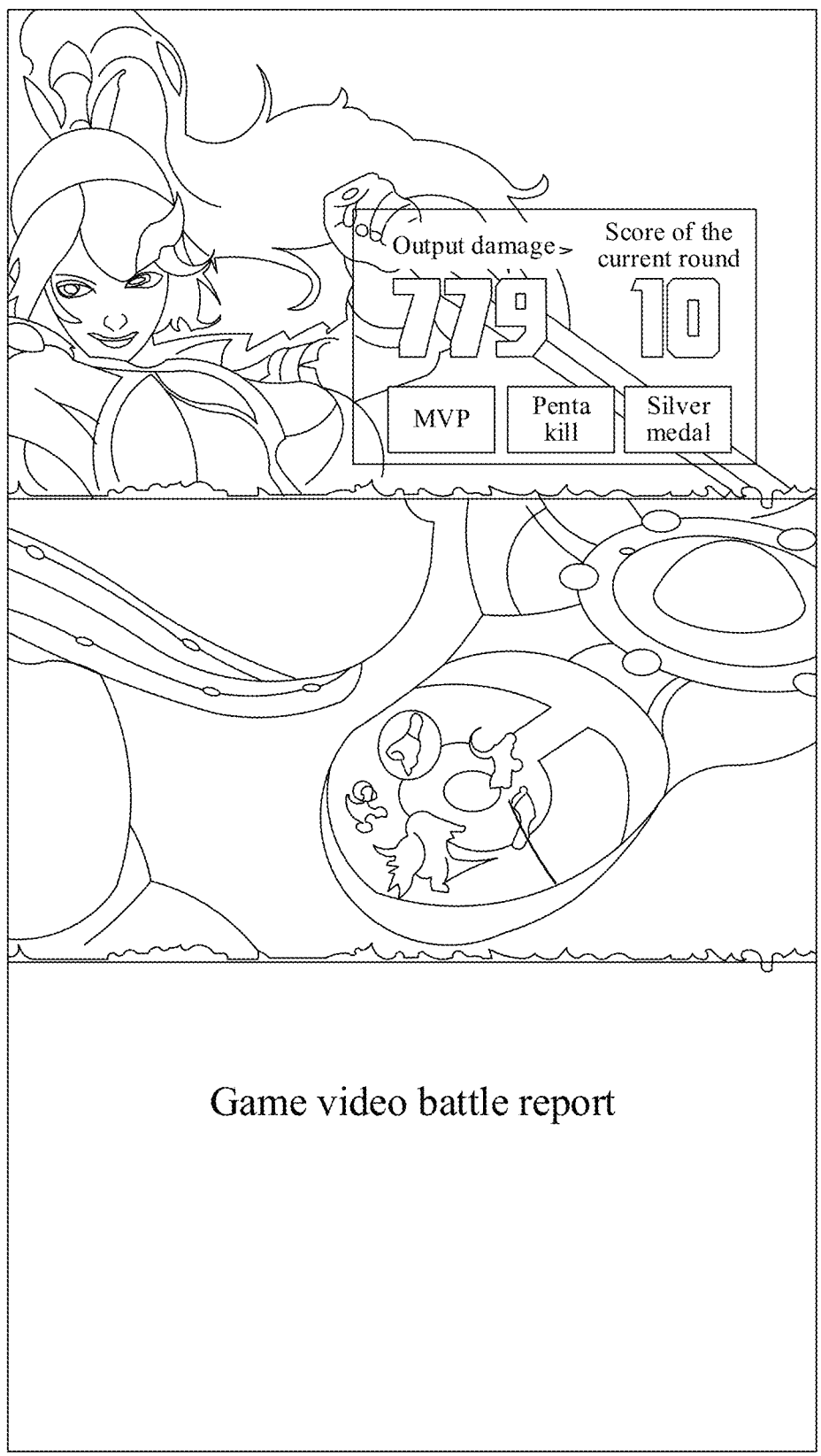
FIG. 4 is a schematic diagram of an application effect of a video special effect processing method in a scene of a game weekly battle report video according to an embodiment of this application.

The video special effect processing method provided in the embodiments of this application is widely applied in game weekly battle report videos. FIG. 4 is a schematic diagram of an application effect of a video special effect processing method in a scene of a game weekly battle report video according to an embodiment of this application. The terminal needs to present a horizontal video (a native video) in a middle region and a sticker animation (corresponding to the special effect object of the video special effect file) in a vertical region. The sticker animation in the vertical region is achieved through a PAG sticker animation, and this is a vertical screen animation, presented in a top and bottom edge region of the video and accompanied by a periodic animation effect. In other application scenarios, there is a case in which slice header and end of the sticker animation are fixed, and content of a middle part is time-stretched according to a requirement. The requirement may be a target playback duration, and the target playback duration may be a duration of the horizontal video (a duration of the native video). The schematic diagram of the application effect in FIG. 4 may be implemented through the following steps. The client triggers delivery logic that requests the server to deliver a weekly battle report video, so that the server delivers the weekly battle report video to the client. In response to receiving the weekly battle report video (the native video) returned from the server and a corresponding video special effect file, the client obtains a duration of the weekly battle report video as a target playback duration, decodes the video special effect file based on the target playback duration, and performs corresponding duration scaling, so that a special effect object on which the duration scaling has been performed is adapted to the duration of the weekly battle report video. Finally, the special effect object is rendered and displayed at the same time as the weekly battle report video, and a displayed effect is the weekly battle report video with the special effect object.

Figure 5:
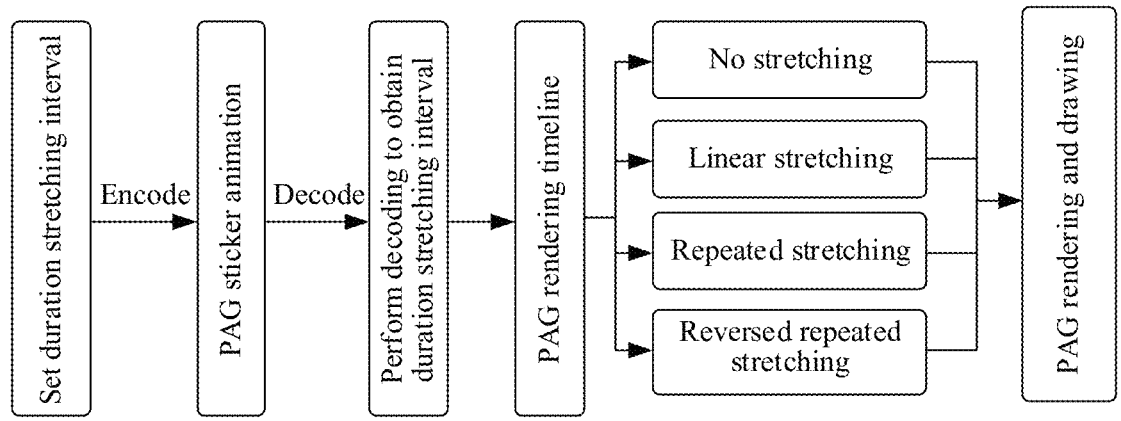
FIG. 5 is a flowchart of a video special effect processing system according to an embodiment of this application.

FIG. 5 is a flowchart of a video special effect processing system according to an embodiment of this application. First, a scaling interval and a scaling type of a sticker animation is set through a plug-in in AE. FIG. 6B is a schematic diagram of annotations of a video special effect processing method according to an embodiment of this application. The annotations are added to total composition of the sticker animation, and the plug-in in AE can support adding annotations to layers. (1) Perform an operation of clicking on a blank region, so that no layer is selected. (2) Present a layer menu in response to an operation of clicking a layer control. (3) Implement the process of adding annotations in response to an operation of adding annotations. In this way, with reference to a specific usage scenario, related identifiers, such as a duration scaling interval and a duration scaling type, may be added to facilitate subsequent rendering by a rendering SDK according to the duration scaling interval and the duration scaling type. FIG. 6C is a schematic diagram of annotations of a video special effect processing method according to an embodiment of this application. Specifically, a duration scaling interval and four duration scaling types may be set. A specific setting process is as follows: (1) Present a settings page in response to an operation of double-clicking an annotation. (2) Receive a duration scaling type (that is, content filled in) in the settings page. (3) Receive a modified start time in the settings page. (4) Receive an operation of confirming saving. The duration scaling types include the following ones: 1. No scaling type: indicating that no duration scaling is required; 2. Linear scaling type: when a target playback duration of an entire PAG sticker animation is set to be longer than an original playback duration of an original PAG sticker animation, linear scaling is performed in a duration scaling interval; and when the target playback duration of the entire PAG sticker animation is set to be shorter than the original playback duration of the original PAG sticker animation, linear scaling is performed in the duration scaling interval; 3. Repeated type: the time scaling type is the repeated type, and when the target playback duration of the entire PAG sticker animation is set to be longer than the original playback duration of the original PAG sticker animation, periodic scaling is performed in the duration scaling interval; 4. Reversed repeated type: when the target playback duration of the entire PAG sticker animation is set to be longer than the original playback duration of the original PAG sticker animation, periodic scaling is performed in the duration scaling interval in reverse order, that is, play in forward order is first performed, then play in backward order is performed, then play in forward order is performed, then play in backward order is performed, and so on.

After the duration scaling interval and type are successfully set, the special effect object is encoded to obtain a PAG sticker animation file, and the PAG sticker animation file is exported. The duration scaling type and the duration scaling interval are added at a root path level of the file by modifying a data structure of the PAG sticker animation file to facilitate encoding. Specifically, for use on a platform side, a decoding module of a rendering SDK needs to decode and read corresponding data to obtain a time scaling interval, and obtain a PAG rendering timeline (including: no scaling, linear scaling, repeated scaling, and reversed repeated scaling) based on the time scaling interval. The rendering SDK may be a client SDK or a server SDK. The client SDK completes rendering (PAG rendering and drawing) on the client, and the server side SDK completes rendering (PAG rendering and drawing) on the server.

In order to add a function of supporting duration scaling to the PAG sticker animation, and because rendering logic of an animation designed based on AE is relatively complex, for example, with related effects such as trajectory calculation and time easing, if an animation time scaling function is implemented by modifying animation features of a specific layer of the PAG sticker animation, the implementation complexity is quite high. Therefore, it is not appropriate to modify specific animation feature of the layer of the PAG sticker animation. In this case, encapsulation may be performed based on original rendering time calculation logic on a rendering side. The duration scaling function is implemented by changing a rendering progress of the original animation file. The specific rendering progress of the duration scaling interval is calculated.

FIG. 7 is a schematic diagram of a timeline of a video special effect processing method according to an embodiment of this application. A minimum time unit for each of an original timeline and a target timeline is a frame. If a frame rate is 24 frames per second, it indicates that 24 frames are presented in one second, and the minimum time unit is $\frac{1}{24}$ second. An original playback duration of a PAG sticker animation file is m, including a duration scaling interval (a, b). If a duration scaling type is a no scaling type, rendering logic remains the same as previous logic and no duration scaling is performed. If the duration scaling type is several other types, and a target playback duration after scaling is n, a calculation process of a specific rendering progress is as follows: First a time scaling factor k is calculated, where k=(b−a)/(n−m+b−a); t is a rendering time point after scaling, that is, a target timestamp on the target timeline, and f(t) is an original special effect frame timestamp on the original timeline of the PAG sticker animation for actual rendering. When the time scaling type is a linear scaling type, the original special effect frame timestamp on the original timeline of the PAG sticker animation for actual rendering is calculated according to the following formula (4):

$$f(t) = \begin{cases} t, 0 \le t \le a \\ a + k(t-a), a < t < n - m + b \\ m - n + t, n - m + b \le t \le n \end{cases} \quad (4)$$

When the time scaling type is a repeated type, the original special effect frame timestamp on the original timeline of the PAG sticker animation for actual rendering is calculated according to the following formula (5):

$$f(t) = \begin{cases} t, 0 \le t \le a \\ a + (t-a) \% (b-a), a < t < n - m + b \\ m - n + t, n - m + b \le t \le n \end{cases} \quad (5)$$

When the time scaling type is a reversed repeated type, when a<t<n−m+b, the original special effect frame timestamp on the original timeline of the PAG sticker animation for actual rendering is calculated in two cases: When a calculation result of (t−a)/(b−a) is rounded to an even number, f (t)=α+(t−α)% (b−α), and when the calculation result of (t−a)/(b−a) is rounded to an odd number, f(t)=b−(t−α)% (b−α). When t is a value within another range, it is the same as the foregoing calculation. When there are multiple duration scaling intervals in the PAG sticker animation, the calculation method is similar, and calculation needs to be performed for the multiple duration scaling intervals. After f(t) is calculated through the foregoing formulas, a rendering module in a rendering SDK can obtain through rendering an animation picture corresponding to a finally required special effect according to the corresponding original special effect frame timestamp, and finally the animation picture of the special effect object and a weekly battle report video are displayed at the same time. A displayed effect is the weekly battle report video with the special effect object.

The embodiments of this application provide a video special effect processing method that can well resolve a problem of contradiction between a variable duration requirement for a special effect animation in a user interface animation (such as video editing) or in a server-side special effect video rendering scenario and a fixed duration of a sticker animation file designed by a designer. During designing of a sticker animation effect, after the designer sets a duration scaling interval and a duration scaling type, only a target playback duration of a sticker animation needs to be set on any platform side during use, and then a time scaling effect of the animation can be achieved.

The following continues to describe an exemplary structure in which the video special effect processing apparatus 455 provided in the embodiments of this application is implemented as a software module. In some embodiments, as shown in FIG. 2, software modules of the video special effect processing apparatus 455 stored in the memory 450 may include: a file obtaining module 4551, configured to obtain a video special effect file, and extract a duration scaling policy from the video special effect file; a duration obtaining module 4552, configured to obtain a target playback duration that needs to be achieved during application of the video special effect file to a design scene, the target playback duration being different from an original playback duration of the video special effect file; a special effect frame determining module 4553, configured to determine a special effect frame corresponding to a target timeline in the video special effect file according to the duration scaling policy; a length of the target timeline being consistent with the target playback duration; and a rendering module 4554, configured to perform rendering according to the special effect frame corresponding to the target timeline, to obtain a target video special effect conforming to the target playback duration.

In some embodiments, the file obtaining module 4551 is further configured to perform one of the following processing operations: encoding multiple layer structures of a special effect object, to obtain an encoded export file corresponding to the special effect object; encoding multiple special effect frames of a special effect object, to obtain an encoded export file corresponding to the special effect object; or performing video format compression on multiple special effect frames of a special effect object, and encoding an obtained video format compression result, to obtain an encoded export file corresponding to the special effect object; and encapsulating a duration scaling type and a duration scaling interval in the encoded export file, to obtain a video special effect file corresponding to the special effect object.

In some embodiments, the duration scaling policy includes a duration scaling interval and a corresponding duration scaling type; and the file obtaining module 4551 is further configured to decode the video special effect file to obtain at least one duration scaling interval corresponding to the video special effect file and a corresponding duration scaling type; the duration scaling type including any one of the following types: a time linear scaling type; a time repetition type; or a reversed time repetition type.

In some embodiments, the duration obtaining module 4552 is further configured to: in accordance with a determination that a quantity of the at least one duration scaling interval is multiple, divide the video special effect file into multiple video special effect subfiles consistent with the quantity, and respectively obtain a target playback duration for each of the video special effect subfiles; and in accordance with a determination that a quantity of the at least one duration scaling interval is one, obtain an overall target playback duration for the video special effect file.

In some embodiments, the duration obtaining module 4552 is further configured to: after obtaining the target playback duration that needs to be achieved during application of the video special effect file to the design scene, in accordance with a determination that a quantity of the at least one duration scaling interval is multiple, perform the following processing operations for each of the video special effect subfiles: obtaining an original timeline corresponding to a special effect object from the video special effect subfile; and maintaining a frame rate of the original timeline unchanged, and performing duration scaling on the original timeline to obtain a target timeline corresponding to the target playback duration; or in accordance with a determination that a quantity of the at least one duration scaling interval is one, performing the following processing operations for the video special effect file: obtaining an original timeline corresponding to a special effect object from the video special effect file; and maintaining a frame rate of the original timeline unchanged, and perform duration scaling on the original timeline to obtain a target timeline corresponding to the target playback duration.

In some embodiments, in accordance with a determination that a quantity of the at least one duration scaling interval is multiple, the special effect frame determining module 4553 is further configured to perform the following processing operations for each duration scaling interval: obtaining, from the video special effect subfile, multiple special effect frames including the special effect object and a timestamp corresponding to each of the special effect frames on the original timeline, and using the timestamp as an original special effect frame timestamp of each of the special effect frames; and determining, in the multiple special effect frames, a special effect frame corresponding to each timestamp on the target timeline based on the duration scaling interval and the original special effect frame timestamp of each of the special effect frames.

In some embodiments, in accordance with a determination that a quantity of the at least one duration scaling interval is one, the special effect frame determining module 4553 is further configured to: obtain, from the video special effect file, multiple special effect frames including the special effect object and a timestamp corresponding to each of the special effect frames on the original timeline, and use the timestamp as an original special effect frame timestamp of each of the special effect frames; and determine, in the multiple special effect frames, a special effect frame corresponding to each timestamp on the target timeline based on the duration scaling interval and the original special effect frame timestamp of each of the special effect frames.

In some embodiments, the special effect frame determining module 4553 is further configured to: sequentially use the each timestamp on the target timeline as a target timestamp, and perform the following processing operations: determining a corresponding original timestamp of the target timestamp on the original timeline based on the duration scaling interval; and in accordance with a determination that the corresponding original timestamp of the target timestamp on the original timeline overlaps any of the original special effect frame timestamps, determining a special effect frame corresponding to the overlapping original special effect frame timestamp as a special effect frame corresponding to the target timestamp; or in accordance with a determination that the corresponding original timestamp of the target timestamp on the original timeline does not overlap any of the original special effect frame timestamps, determining an original special effect frame timestamp with a smallest distance from the original timestamp, and determining a special effect frame corresponding to the original special effect frame timestamp as a special effect frame corresponding to the target timestamp.

In some embodiments, the special effect frame determining module 4553 is further configured to: perform the following processing operation for each of the duration scaling intervals: in accordance with a determination that the target timestamp is not greater than a start timestamp of the duration scaling interval, determining the target timestamp as a corresponding original timestamp on the original timeline; or in accordance with a determination that the target timestamp is greater than a start timestamp of the duration scaling interval and less than an end timestamp of the duration scaling interval, mapping the target timestamp based on the duration scaling type to obtain a corresponding original timestamp; or in accordance with a determination that the target timestamp is greater than or equal to an end timestamp and less than the target playback duration, determining a first difference between the original play duration and the target playback duration, performing summation the first difference and the target timestamp, and determining a summation result as the corresponding original timestamp of the target timestamp on the original timeline.

In some embodiments, the special effect frame determining module 4553 is further configured to: in accordance with a determination that the duration scaling type is the time linear scaling type, determine a second difference between the target playback duration and the original playback duration as a scaling length, and perform summation on the scaling length and a length of the duration scaling interval; perform ratio calculation on the length of the duration scaling interval and a summation result to obtain a scaling factor; determine a third difference between the target timestamp and the start timestamp, and multiply the third difference and the scaling factor together; and perform summation on a multiplication result and the start timestamp to obtain the corresponding original timestamp.

In some embodiments, the special effect frame determining module 4553 is further configured to: in accordance with a determination that the duration scaling type is the time repetition type, determine a fourth difference between the target timestamp and the start timestamp, and perform remainder calculation on the fourth difference and the length of the duration scaling interval; and perform summation on a remainder calculation result and the start timestamp to obtain the corresponding original timestamp.

In some embodiments, the special effect frame determining module 4553 is further configured to: in accordance with a determination that the duration scaling type is the reversed time repetition type, determine a fifth difference between the target timestamp and the start timestamp; perform remainder calculation on the fifth difference and the length of the duration scaling interval to obtain a remainder calculation result, and perform ratio calculation on the fifth difference and the length of the duration scaling interval to obtain a ratio result; round up the ratio result to obtain a rounding result; and in accordance with a determination that the rounding result is an even number, perform summation on the remainder calculation result and the start timestamp to obtain the corresponding original timestamp; or in accordance with a determination that the rounding result is an odd number, determine a sixth difference between the length of the duration scaling interval and the remainder calculation result, and perform summation on the sixth difference and the start timestamp to obtain the corresponding original timestamp.

An embodiment of this application provides a non-transitory computer-readable storage medium storing executable instructions. When executed by a processor, the executable instructions cause the processor to implement the video special effect processing method provided in the embodiments of this application, for example, the video special effect processing method shown in FIG. 3A to FIG. 3E.

An embodiment of this application provides a computer program product or a computer program. The computer program product or the computer program includes computer instructions, and the computer instructions are stored in a non-transitory computer-readable storage medium. The processor of the electronic device reads the computer instruction from the computer-readable storage medium. The processor executes the computer instruction, so that the electronic device performs the video special effect processing method of the embodiments of this application.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on an electronic device, or deployed to be executed on a plurality of electronic devices at the same location, or deployed to be executed on a plurality of electronic devices that are distributed in a plurality of locations and interconnected by using a communication network.

In summary, according to the embodiments of this application, encapsulating a duration scaling policy in a video special effect file causes a video special effect file to be freely stretched to playback durations required by different application scenarios, which is universally applicable, and rendering is performed based on this to obtain a target video special effect, thereby reducing the huge consumption of computer resources and time resources caused by producing a large quantity of video special effect files with different playback durations.

The foregoing descriptions are merely embodiments of this application and are not intended to limit the protection scope of this application. Any modification, equivalent replacement, or improvement made without departing from the spirit and range of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs scaling logic extraction and/or effects processing. In practical application, the foregoing functions may be allocated to and completed by different functional modules according to requirements, that is, an inner structure of a device is divided into different functional modules to implement all or a part of the functions described above.

What is claimed is:

1. A video special effect processing method, performed by an electronic device, the method comprising:
    obtaining a video special effect file;
    extracting a duration scaling logic from the video special effect file, wherein the duration scaling logic includes a duration scaling interval and a corresponding duration scaling type, the corresponding duration scaling type selected from a plurality of: a time linear scaling type, a time repetition type, and a reversed time repetition type;
    obtaining a target playback duration that needs to be achieved during application of the video special effect file to a design scene for video playback, wherein the target playback duration is distinct from an original playback duration of the video special effect file;
    determining a special effect frame corresponding to a target timeline in the video special effect file according to the duration scaling interval and the duration scaling type included in the duration scaling logic, wherein a length of the target timeline is the same as the target playback duration; and
    rendering a plurality of frames of a video according to the special effect frame, so as to obtain a target video special effect that matches the target playback duration.

2. The method according to claim 1, wherein obtaining a video special effect file comprises one or more of:
    encoding multiple layer structures of a special effect object, to obtain an encoded export file corresponding to the special effect object;
    encoding multiple special effect frames of a special effect object, to obtain an encoded export file corresponding to the special effect object;
    performing video format compression on multiple special effect frames of a special effect object, and encoding an obtained video format compression result, to obtain an encoded export file corresponding to the special effect object; or
    encapsulating a duration scaling type and a duration scaling interval in the encoded export file, to obtain a video special effect file corresponding to the special effect object.

3. The method according to claim 1, wherein extracting the duration scaling logic comprises:
    decoding the video special effect file to obtain at least one duration scaling interval corresponding to the video special effect file and the corresponding duration scaling type.

4. The method according to claim 1, wherein obtaining the target playback duration that needs to be achieved comprises:
    determining a number of duration scaling intervals;
    in accordance with a determination that the number of duration scaling intervals is more than one:
        dividing the video special effect file into multiple video special effect subfiles consistent with the determined number; and respectively obtaining a target playback duration for each of the video special effect subfiles; and in accordance with a determination that the number of duration scaling intervals is one, obtaining an overall target playback duration for the video special effect file.

5. The method according to claim 4, further comprising after obtaining the target playback duration that needs to be achieved:

in accordance with a determination that the number of duration scaling intervals is more than one:
for each of the multiple video special effect subfiles:
obtaining an original timeline corresponding to a special effect object from the video special effect subfile;
maintaining a frame rate of the original timeline unchanged; and
performing duration scaling on the original timeline to obtain a target timeline corresponding to the target playback duration.

6. The method according to claim 5, further comprising:
in accordance with the determination that the number of duration scaling intervals is more than one, determining the special effect frame corresponding to the target timeline in the video special effect file comprises:
obtaining, from the video special effect subfile, multiple special effect frames comprising the special effect object and a timestamp corresponding to each of the special effect frames on the original timeline, and using the timestamp as an original special effect frame timestamp of each of the special effect frames; and
determining, in the multiple special effect frames, a special effect frame corresponding to each timestamp on the target timeline based on the duration scaling interval and the original special effect frame timestamp of each of the special effect frames.

7. The method according to claim 6, wherein determining, in the multiple special effect frames, a special effect frame corresponding to each timestamp on the target timeline based on the duration scaling interval and the original special effect frame timestamp of each of the special effect frames comprises:
sequentially using the each timestamp on the target timeline as a target timestamp;
determining a corresponding original timestamp of the target timestamp on the original timeline based on the duration scaling interval;
in accordance with a determination that the corresponding original timestamp of the target timestamp on the original timeline overlaps any of the original special effect frame timestamps, determining a special effect frame corresponding to the overlapping original special effect frame timestamp as a special effect frame corresponding to the target timestamp; and
in accordance with a determination that the corresponding original timestamp of the target timestamp on the original timeline does not overlap any of the original special effect frame timestamps, determining an original special effect frame timestamp with a smallest distance from the original timestamp, and determining a special effect frame corresponding to the original special effect frame timestamp as a special effect frame corresponding to the target timestamp.

8. The method according to claim 7, wherein determining the corresponding original timestamp of the target timestamp on the original timeline based on the duration scaling interval comprises one of:

scaling in accordance with a determination that the target timestamp is not greater than a start timestamp of the duration scaling interval, determining the target timestamp as a corresponding original timestamp on the original timeline; or in accordance with a determination that the target timestamp is greater than a start timestamp of the duration scaling interval and less than an end timestamp of the duration scaling interval, mapping the target timestamp based on the duration scaling type to obtain a corresponding original timestamp; or in accordance with a determination that the target timestamp is greater than or equal to an end timestamp and less than the target playback duration, determining a first difference between the original playback duration and the target playback duration, adding the first difference and the target timestamp to obtain a first summation result, and determining the first summation result as the corresponding original timestamp of the target timestamp on the original timeline.

9. The method according to claim 8, wherein mapping the target timestamp based on the duration scaling type to obtain a corresponding original timestamp comprises:
in accordance with a determination that the duration scaling type is the time linear scaling type, determining a second difference between the target playback duration and the original playback duration as a scaling length, and adding the scaling length and a length of the duration scaling interval to obtain a second summation result;
performing ratio calculation on the length of the duration scaling interval and a second summation result to obtain a scaling factor;
determining a third difference between the target timestamp and the start timestamp, and multiplying the third difference and the scaling factor together; and
performing summation on a multiplication result and the start timestamp to obtain the corresponding original timestamp.

10. The method according to claim 8, wherein the mapping target timestamp based on the duration scaling type to obtain a corresponding original timestamp comprises:
in accordance with a determination that the duration scaling type is the time repetition type, determining a fourth difference between the target timestamp and the start timestamp, and performing remainder calculation on the fourth difference and the length of the duration scaling interval; and
performing summation on a remainder calculation result and the start timestamp to obtain the corresponding original timestamp.

11. The method according to claim 8, wherein mapping the target timestamp based on the duration scaling type to obtain a corresponding original timestamp comprises:
in accordance with a determination that the duration scaling type is the reversed time repetition type, determining a fifth difference between the target timestamp and the start timestamp;
performing remainder calculation on the fifth difference and the length of the duration scaling interval to obtain a remainder calculation result, and performing ratio calculation on the fifth difference and the length of the duration scaling interval to obtain a ratio result;
rounding up the ratio result to obtain a rounding result;
in accordance with a determination that the rounding result is an even number, performing summation on the remainder calculation result and the start timestamp to obtain the corresponding original timestamp; and in accordance with a determination that the rounding result is an odd number, determining a sixth difference between the length of the duration scaling interval and the remainder calculation result, and performing summation on the sixth difference and the start timestamp to obtain the corresponding original timestamp.

12. The method according to claim 4, further comprising:
in accordance with the determination that the number of duration scaling intervals is one:
obtaining an original timeline corresponding to a special effect object from the video special effect file; and
maintaining a frame rate of the original timeline unchanged, and performing duration scaling on the original timeline to obtain a target timeline corresponding to the target playback duration.

13. The method according to claim 12, further comprising:
in accordance with a determination that the number of duration scaling intervals is one, determining the special effect frame corresponding to the target timeline in the video special effect file comprises:
obtaining, from the video special effect file, multiple special effect frames comprising the special effect object and a timestamp corresponding to each of the special effect frames on the original timeline, and using the timestamp as an original special effect frame timestamp of each of the special effect frames; and
determining, in the multiple special effect frames, a special effect frame corresponding to each timestamp on the target timeline based on the duration scaling interval and the original special effect frame timestamp of each of the special effect frames.

14. An electronic device, comprising:
one or more processors; and
memory storing one or more programs, the one or more programs comprising instructions that, when executed by the one or more processors, cause the one or more processors to perform operations comprising:
obtaining a video special effect file;
extracting a duration scaling logic from the video special effect file, wherein the duration scaling logic includes a duration scaling interval and a corresponding duration scaling type, the corresponding duration scaling type selected from a plurality of: a time linear scaling type, a time repetition type, and a reversed time repetition type;
obtaining a target playback duration that needs to be achieved during application of the video special effect file to a design scene for video playback, wherein the target playback duration is distinct from an original playback duration of the video special effect file;
determining a special effect frame corresponding to a target timeline in the video special effect file according to the duration scaling interval and the duration scaling type included in the duration scaling logic, wherein a length of the target timeline is the same as the target playback duration; and
rendering a plurality of frames of a video according to the special effect frame, so as to obtain a target video special effect that matches the target playback duration.

15. The electronic device according to claim 14, wherein obtaining a video special effect file comprises one or more of:
encoding multiple layer structures of a special effect object, to obtain an encoded export file corresponding to the special effect object;
encoding multiple special effect frames of a special effect object, to obtain an encoded export file corresponding to the special effect object;
performing video format compression on multiple special effect frames of a special effect object, and encoding an obtained video format compression result, to obtain an encoded export file corresponding to the special effect object; or
encapsulating a duration scaling type and a duration scaling interval in the encoded export file, to obtain a video special effect file corresponding to the special effect object.

16. The electronic device according to claim 14, wherein extracting the duration scaling logic comprises:
decoding the video special effect file to obtain at least one duration scaling interval corresponding to the video special effect file and the corresponding duration scaling type.

17. The electronic device according to claim 14, wherein obtaining the target playback duration that needs to be achieved comprises:
determining a number of duration scaling intervals;
in accordance with a determination that the number of duration scaling intervals is more than one:
dividing the video special effect file into multiple video special effect subfiles consistent with the determined number; and
respectively obtaining a target playback duration for each of the video special effect subfiles; and
in accordance with a determination that the number of duration scaling intervals is one, obtaining an overall target playback duration for the video special effect file.

18. The electronic device according to claim 17, the operations further comprising after obtaining the target playback duration that needs to be achieved:
in accordance with a determination that the number of duration scaling intervals is more than one:
for each of the multiple special effect subfiles:
obtaining an original timeline corresponding to a special effect object from the video special effect subfile;
maintaining a frame rate of the original timeline unchanged; and
performing duration scaling on the original timeline to obtain a target timeline corresponding to the target playback duration.

19. A non-transitory computer-readable storage medium, storing a computer program, the computer program, when executed by one or more processors of an electronic device, cause the electronic device to perform operations comprising:
obtaining a video special effect file;
extracting a duration scaling logic from the video special effect file, wherein the duration scaling logic includes a duration scaling interval and a corresponding duration scaling type, the corresponding duration scaling type selected from a plurality of: a time linear scaling type, a time repetition type, and a reversed time repetition type;
obtaining a target playback duration that needs to be achieved during application of the video special effect file to a design scene for video playback, wherein the target playback duration is distinct from an original playback duration of the video special effect file;

determining a special effect frame corresponding to a target timeline in the video special effect file according to the duration scaling interval and the duration scaling type included in the duration scaling logic, wherein a length of the target timeline is the same as the target playback duration; and rendering a plurality of frames of a video according to the special effect frame, so as to obtain a target video special effect that matches the target playback duration.

20. The non-transitory computer readable storage medium according to claim 19, wherein obtaining a video special effect file comprises one or more of:

encoding multiple layer structures of a special effect object, to obtain an encoded export file corresponding to the special effect object;

encoding multiple special effect frames of a special effect object, to obtain an encoded export file corresponding to the special effect object;

performing video format compression on multiple special effect frames of a special effect object, and encoding an obtained video format compression result, to obtain an encoded export file corresponding to the special effect object; or encapsulating a duration scaling type and a duration scaling interval in the encoded export file, to obtain a video special effect file corresponding to the special effect object.

* * * * *